US012630376B2

(12) United States Patent
Martel et al.

(10) Patent No.: US 12,630,376 B2
(45) Date of Patent: May 19, 2026

(54) TILT HOIST SYSTEM WITH TRANSITION ASSEMBLY AND CORRESPONDING METHODS

(71) Applicant: 9389-8948 QUÉBEC INC., Dolbeau-Mistassini (CA)

(72) Inventors: Gino Martel, Albanel (CA); Sylvain Minier, Normandin (CA); Patrick Sasseville, Dolbeau-Mistassini (CA); Martin Perreault, Dolbeau-Mistassini (CA)

(73) Assignee: 9389-8948 QUEBEC INC., Dolbeau-Mistassini (CA)

( * ) Notice: Subject to any disclaimer, the term of this patent is extended or adjusted under 35 U.S.C. 154(b) by 0 days.

(21) Appl. No.: 18/888,807

(22) Filed: Sep. 18, 2024

(65) Prior Publication Data

US 2025/0108984 A1 Apr. 3, 2025

Related U.S. Application Data

(60) Provisional application No. 63/586,431, filed on Sep. 29, 2023, provisional application No. 63/624,049, filed on Jan. 23, 2024.

(30) Foreign Application Priority Data

Jun. 19, 2024 (CA) ................................. CA 3242058

(51) Int. Cl.
B65G 59/08 (2006.01)
B65G 59/02 (2006.01)
(52) U.S. Cl.
CPC ........... B65G 59/08 (2013.01); B65G 59/026 (2013.01); *B65G 2201/0282* (2013.01)

(58) Field of Classification Search
CPC .................. B65G 59/08; B65G 59/026; B65G 2201/0282; B65G 57/06; B65G 57/18;
(Continued)

(56) References Cited

U.S. PATENT DOCUMENTS 770,170 A * 9/1904 Davis ..................... B66C 23/48
254/109
1,272,472 A 7/1918 Lohman
(Continued)

FOREIGN PATENT DOCUMENTS

CA 2121401 A1 10/1995
DE 3021367 A1 * 12/1981 ............. B65G 59/08
(Continued)

*Primary Examiner* — Gregory W Adams
(74) *Attorney, Agent, or Firm* — Simpson & Simpson, PLLC

(57) ABSTRACT

A tilt hoist system for breaking down a lumber stack having tiers of lumber. The tilt hoist system includes a tilt hoist apparatus to successively bring a topmost tier thereof at a release location, an outfeed, a transition assembly for guiding each tier of lumber to the outfeed, and a transition assembly controller. The transition assembly includes an inclined transition track having a top end positioned to receive each tier of lumber from the tilt hoist apparatus, and a bottom end adjacent to the outfeed. The transition assembly also includes movable retaining arms configurable in a top end configuration in which the retaining arms are positioned to hold said topmost tier at the release location and a bottom end configuration in which the retaining arms are positioned past the bottom end of the transition track. A retaining arm actuator is operatively connected to move the retaining arms.

15 Claims, 23 Drawing Sheets

(58) Field of Classification Search
CPC .......... B65G 65/23; B65G 1/08; B65G 59/02; B65G 59/045; B65G 47/29; B65G 47/295; B65G 47/78; B65H 3/56; B65H 3/54
USPC .............. 271/104, 137, 167; 414/419, 797.9, 414/796.2, 796.7
See application file for complete search history.

(56) References Cited

U.S. PATENT DOCUMENTS

| | | | | |
|---|---|---|---|---|
| 1,683,779 | A | * | 9/1928 | Horstkotte .......... B65G 59/005 221/209 |
| 2,993,609 | A | * | 7/1961 | Enterline .............. F27D 3/0025 414/801 |
| 3,565,266 | A | | 2/1971 | Buss |
| 3,620,387 | A | * | 11/1971 | Elson ................... B65G 59/107 414/796.7 |
| 4,328,951 | A | * | 5/1982 | Laupper ................... B66F 3/30 254/89 H |
| 4,640,655 | A | * | 2/1987 | Jacobsen ............... B65G 59/08 271/158 |
| 4,776,742 | A | * | 10/1988 | Felder ................... B65G 59/08 414/416.09 |
| 4,838,748 | A | | 6/1989 | Johnson |
| 5,249,915 | A | | 10/1993 | Ritola |
| 5,795,126 | A | | 8/1998 | Newnes |
| 5,879,129 | A | | 3/1999 | Newnes et al. |
| 6,379,105 | B1 | | 4/2002 | Aylsworth |
| 7,740,440 | B2 | | 6/2010 | Hannebauer et al. |
| 8,235,380 | B2 | * | 8/2012 | Claris .............. G07B 17/00467 271/119 |
| 10,569,975 | B2 | | 2/2020 | Chiari et al. |
| 10,836,067 | B2 | | 11/2020 | Aylsworth |
| 11,014,262 | B2 | | 5/2021 | Aylsworth |
| 11,014,768 | B2 | | 5/2021 | Aylsworth |
| 11,254,025 | B2 | | 2/2022 | Aylsworth |
| 2021/0229938 | A1 | | 7/2021 | Hove et al. |
| 2022/0297333 | A1 | * | 9/2022 | Bauer ................... B65G 47/57 |
| 2025/0108984 | A1 | * | 4/2025 | Martel ................ B65G 59/026 |

FOREIGN PATENT DOCUMENTS

| | | | | |
|---|---|---|---|---|
| EP | 2078687 | B1 | 6/2011 | |
| SE | 376750 | B | * 6/1975 | ............. B65G 59/08 |
| SE | 382194 | B | * 1/1976 | ............. B65G 59/08 |
| SE | 392453 | B | 3/1977 | |
| SE | 535092 | C2 | 4/2012 | |

* cited by examiner

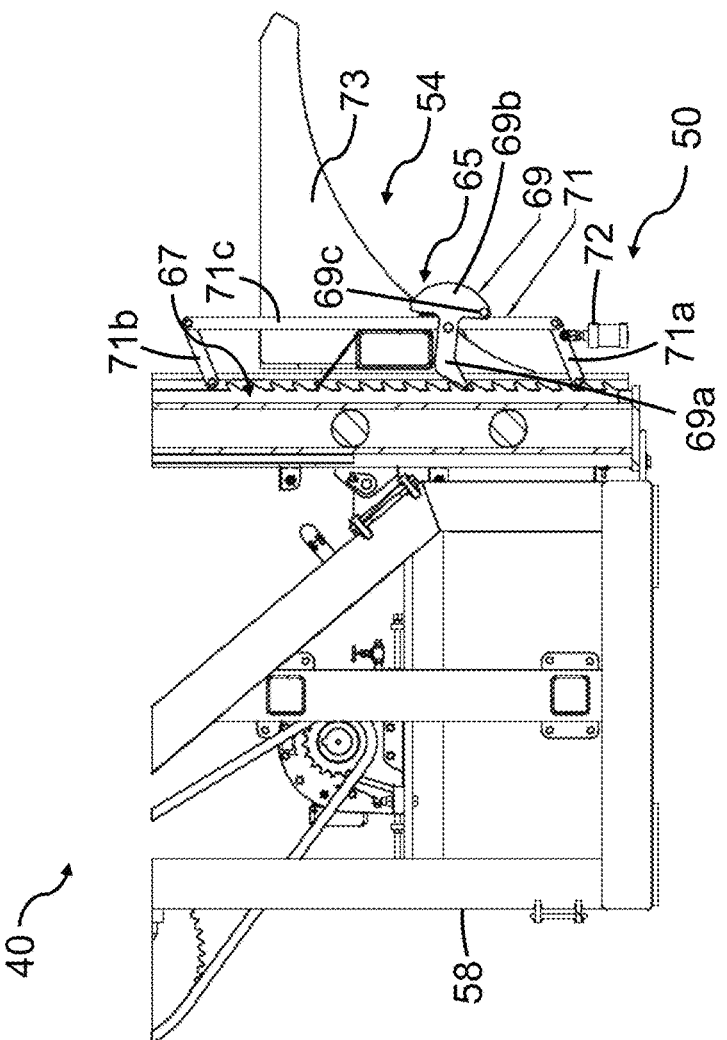
FIG. 13B
FIG. 13A

TILT HOIST SYSTEM WITH TRANSITION ASSEMBLY AND CORRESPONDING METHODS

CROSS-REFERENCE TO RELATED APPLICATIONS

This application claims priority pursuant to 35 U.S.C. § 119(e) to U.S. Provisional Patent Applications 63/586,431 filed on Sep. 29, 2023, and 63/624,049 filed on Jan. 23, 2024, which applications are incorporated herein by reference in their entirety. Further, this application claims priority pursuant to 35 U.S.C. § 119(a) to Canadian Application No. 3,242,058, filed Jun. 19, 2024, which application is incorporated herein by reference in its entirety.

TECHNICAL FIELD

The technical field of the present disclosure generally relates to the processing of lumber, and more particularly to tilt hoist systems to break down tiers of lumber of a lumber stack and corresponding methods.

BACKGROUND ART

Tilt hoist systems, also known as breakdown hoists or simply tilt hoists, are used in the wood industry to separate/undo bundles of lumber into single, continuous rows of boards. For instance, elongated pieces of lumber (or boards) can be stacked as a bundle (or lumber stack) including several superposed rows, wherein the pieces of lumber are arranged side-by-side along their lengths, to facilitate processing, transportation, and storage. However, some processing operations require that the bundles be undone into single and continuous rows of boards, also referred to as tiers. For instance, referring to the non-limitative schematic of FIG. 1, boards 26 are stacked into a bundle 20 following a wood drying operation (not shown). The bundle 20 is then undone for a subsequent board planing operation wherein the rough boards 26 are transformed into uniform lumber boards by a planer P.

Sticks, also referred to as "spacers" 32, can be inserted crosswise in between each tier 22 to space each tier 22 apart from each other so that the lumber pieces 26 of the lumber stack 20 may aerate and dry more effectively in a wood drying equipment (not shown), for instance.

For instance, tilt hoist systems 40 can be provided between the wood drying equipment and the planer P to "break down" the lumber stack 20 at the output of the wood drying equipment into a plurality of tiers 22 that are fed sequentially to the wood planer P.

In some tilt hoist systems 40, the tiers 22 of the lumber stack 20 are successively brought to a release location and successively released to be separated from the subsequent tiers. In proper functioning, the lumber pieces 26 are released from the tilt hoist system 40 as a layer wherein the lumber pieces 26 extend substantially parallel and are non-superposed to one another. However, improper transition of a tier 22 can occur wherein one or more of several pieces of lumber 26 of a tier 22 are dislodged from their original position and cluster at least partially with other pieces of lumber resulting in a disorganized tier. Improper transition of a tier can be caused by the tier sliding down too quickly or in an uncontrolled manner. Improper transition can also be caused by a misalignment of a side edge of a front piece of lumber of the tier 22 when the tier is released. There is thus a need to minimize the improper transition in tilt hoist systems, improve a transition speed of the tier, and/or provide safer tilt hoist systems.

BRIEF SUMMARY

According to one aspect, there is provided a tilt hoist system for breaking down a lumber stack having a plurality of tiers of lumber. The tilt hoist system includes a tilt hoist apparatus, an outfeed, a transition assembly for guiding each tier of lumber from the tilt hoist apparatus to the outfeed, and a transition assembly controller. The tilt hoist apparatus is configured to tilt the lumber stack into an inclined orientation and to lift said lumber stack to successively bring a topmost tier thereof at a release location. The outfeed includes a conveyor configured to receive each tier of lumber from the tilt hoist apparatus and convey the same away from the tilt hoist apparatus. The transition assembly includes: a transition track extending at a downward inclination and having a top end positioned to receive each tier of lumber from the tilt hoist apparatus, and a bottom end adjacent to the outfeed. The transition assembly further includes one or more movable retaining arms. The transition assembly controller is connected to the retaining arms and configured to move the same according to a transition sequence. The transition sequence includes positioning the retaining arms at a top position in which said retaining arms contact a longitudinal side edge of a front piece of lumber of the topmost tier of the lumber stack to receive and hold said topmost tier at the release location; moving the one or more retaining arm away from the tilt hoist apparatus, thereby releasing the topmost tier of lumber onto the transition track, and along a trajectory following the transition track while maintaining said contact with said front piece of lumber; and moving the one or more retaining arm out of contact with the front piece of lumber upon reaching the bottom end of the track, thereby releasing the tier of lumber onto the conveyor of the outfeed.

According to another aspect, there is provided a tilt hoist system for breaking down a lumber stack having a plurality of tiers of lumber. The tilt hoist system includes a tilt hoist apparatus, an outfeed, a transition assembly for guiding each tier of lumber from the tilt hoist apparatus to the outfeed, and a transition assembly controller. The tilt hoist apparatus is configured to tilt the lumber stack into an inclined orientation and to lift said lumber stack to successively bring a topmost tier thereof at a release location. The outfeed includes a conveyor configured to receive each tier of lumber from the tilt hoist apparatus and convey the same away from the tilt hoist apparatus. The transition assembly includes a transition track extending at a downward inclination and having a top end positioned to receive each tier of lumber from the tilt hoist apparatus, and a bottom end adjacent to the outfeed. The transition assembly also includes one or more movable retaining arms configurable in a top end configuration in which the retaining arms are positioned adjacent to the top end of the transition track and contact a longitudinal side edge of a front piece of lumber of the topmost tier of the lumber stack to receive and hold said topmost tier at the release location and a bottom end configuration in which the retaining arms are positioned past the bottom end of the transition track, out of contact with the front piece of lumber upon reaching the bottom end of the track, thereby releasing the tier of lumber onto the conveyor of the outfeed. A retaining arm actuator is operatively connected to the retaining arms to move the retaining arms between the top and bottom end configurations.

According to one embodiment, the transition assembly further includes a rotatable shaft. The one or more retaining arms are distributed along a longitudinal length of the rotatable shaft, and the retaining arm actuator is operatively connected to the shaft and is configured to rotate the shaft between angular orientations corresponding respectively at least to the top and bottom end configurations.

According to one embodiment, each of the one or more retaining arms includes at least two sections including a proximal section secured to the shaft to rotate therewith and a distal section adapted to contact the topmost tier. The distal section is pivotally mounted to the proximal section at a pivot axis. The transition assembly further includes a second actuator operatively connected to at least the distal section to pivot the distal section with respect to the proximal section about the pivot axis.

According to one embodiment, the one or more retaining arms include at least two sets of retaining arms and the shaft comprises at least two shafts. Each one of the two or more sets of retaining arms are operatively connected to a respective one of the at least two shafts. The at least two sets of retaining arms are independently configurable into the top and bottom end configurations.

According to one embodiment, the tilt hoist apparatus is configured to lift the lumber stack continuously.

According to one embodiment, the transition track includes a plurality of spaced-apart rails extending between the release location of the tilt hoist apparatus and the outfeed and the shaft extends above the transition track and transversally thereto.

According to one embodiment, the transition assembly further includes a height adjustment mechanism. Each one of the plurality of rails is pivotally connected to the height adjustment mechanism, and the height adjustment mechanism is activable to modify an inclination of each one of the plurality of rails.

According to one embodiment, the conveyor includes a plurality of spaced-apart conveyor chains. Each conveyor chain has an input end located adjacent to the release location of the tilt hoist apparatus. The plurality of conveyor chains is rotatable to convey the topmost tier away from the tilt hoist apparatus and the tilt hoist system further includes: at least one board sensor, a plurality of conveyor actuators and a conveyor controller. The at least one board sensor is configured to monitor a board deformation of at least a portion of the topmost tier. Each one of the plurality of conveyor actuators is operatively connected to a respective one of the conveyor chains to adjust a relative height thereof. The conveyor controller is operatively connected to the board sensors and the conveyor actuators to adjust a relative height of the conveyor chains using the board deformation of the topmost tier monitored by the at least one board sensor. In an embodiment, the at least one board sensor comprises a plurality of board sensors.

According to one embodiment, the tilt hoist system further includes a pusher or dagger assembly configured to contact at least a rear lumber of the topmost tier and guide same in direction of the outfeed when the topmost tier is released from the release location.

According to one embodiment, the tilt hoist apparatus includes: a support base, a lift and a lift safety mechanism. The lift has a stack-supporting platform translatably mounted to the support base, and the lift safety mechanism prevents unintentionally lowering the stack-supporting platform along the support base.

According to yet another general aspect, there is provided a tilt hoist system for breaking down a lumber stack having a plurality of tiers of lumber. The tilt hoist system includes a tilt hoist apparatus, an outfeed, and a pusher or dagger assembly. The tilt hoist apparatus is configured to tilt the lumber stack into an inclined orientation and to lift said lumber stack to successively bring a topmost tier thereof at a release location. The outfeed includes a conveyor configured to receive each tier of lumber from the tilt hoist apparatus and convey the same away from the tilt hoist apparatus. The pusher or dagger assembly is configured to contact at least a rear lumber of the topmost tier and guide same in direction of the outfeed when the topmost tier is released from the release location.

According to one embodiment, the pusher or dagger assembly further includes a main body and a translatable arm at least partially housed in the main body and translatable with respect to the main body into a proximal configuration and a distal configuration. In the distal configuration, the translatable arm contacts the endless transmission unit to engage same in rotation.

According to one embodiment, the endless transmission unit includes lugs protruding from an outer surface thereof to enable the engagement with the rear lumber of the topmost tier.

According to still another aspect, there is provided a method for operating a tilt hoist system for breaking down a lumber stack having a plurality of tiers of lumber. The method includes: releasing a topmost tier of the lumber stack from a release location towards an outfeed including a conveyor, the topmost tier including a plurality of boards extending substantially parallel to one another and perpendicular to a conveying direction of the tilt hoist system; detecting if a configuration of the boards of the released topmost tier is skewed during transfer from the release location to the outfeed; and if a skewed configuration of the boards of the released topmost tier is detected during transfer, at least one of stopping the conveyor of the outfeed, stopping the transferring of the topmost tier towards the conveyor of the outfeed, and adjusting a relative height of the boards of the topmost tier via an actuator of the tilt hoist system.

According to one general aspect, there is provided a method for operating a tilt hoist system for breaking down a lumber stack having a plurality of tiers of lumber. The method comprises: raising the lumber stack to have at least two topmost tiers extending above an upper threshold of the tilt hoist system at a release location; releasing an uppermost one of the at least two topmost tiers onto a section of the tilt hoist system located downstream of the release location, towards an outfeed of the tilt hoist system and simultaneously exposing a subsequent topmost tier of the stack; until all of the at least two topmost tiers extending above the upper threshold of the tilt hoist system have been released onto the section of the tilt hoist system located downstream of the release location, lowering the section of the tilt hoist system located downstream of the release location; and releasing the subsequent topmost tier of the stack onto the section of the tilt hoist system located downstream of the release location and simultaneously exposing the subsequent topmost tier of the stack.

According to yet one more aspect, there is provided a tilt hoist system for breaking down a lumber stack having a plurality of tiers of lumber. The tilt hoist system includes a tilt hoist apparatus configured to lift the lumber stack. The tilt hoist apparatus includes a support base, a lift having a stack-supporting platform, the lift being translatably mounted to the support base, and a lift safety mechanism preventing unintentionally lowering of the stack-supporting platform along the support base.

According to one embodiment, the lift safety mechanism includes a toothed rack, a pivotable pawl and a lever assembly. The toothed rack is secured to the support base. The pivotable pawl is pivotally mounted to the lift and engageable with the toothed rack in a locking configuration. The lever assembly disengages the pawl from the toothed rack in an unlocking configuration to intentionally lower the lift onto the support base.

According to one embodiment, the pawl of the lift safety mechanism is biased to maintain the lift safety mechanism in the locking configuration with the toothed rack.

According to one embodiment, the pawl includes a finger portion and a counterweight portion. The finger portion is adapted to engage the toothed rack at a distal end thereof in the locking configuration. The pawl is pivotally mounted about the lever assembly.

According to one embodiment, the lever assembly includes a first support arm and a second support arm pivotally mounted to one of the toothed rack and the support structure at different heights thereof and an unlocking lever pivotally interconnected at opposite ends to the first and second support arms. The lever assembly is sized to contact the pawl in an extended configuration.

According to one embodiment, the pawl includes a pin protruding transversely from a lower side of the counterweight portion. The pin is engageable by the unlocking lever of the lever assembly to pivot the finger portion of the pawl into the unlocking configuration.

According to another aspect, there is provided a tilt hoist system for breaking down a lumber stack having a plurality of tiers of lumber. The tilt hoist system includes a tilt hoist apparatus. The tilt hoist apparatus is configured to lift the lumber stack in an inclined or vertical orientation. The tilt hoist apparatus further includes a support base, a lift having a stack-supporting platform, and a lift safety mechanism. The lift is translatably mounted to the support base. The lift safety mechanism prevents an unintentional lowering of the stack-supporting platform along the support base.

According to another aspect, there is provided a method for operating a tilt hoist system for breaking down a lumber stack having a plurality of tiers of lumber. The method comprises:

raising continuously the lumber stack and raising simultaneously transition track of a transition assembly to maintain substantial alignment between an upper surface of the transition track and a lower surface of a topmost tier;

when the topmost tier of the lumber stack reaches a release location, releasing the topmost tier onto the transition track located downstream of the release location, towards an outfeed of the tilt hoist system and simultaneously exposing a subsequent topmost tier of the stack while still raising continuously the lumber stack and the transition track; and when an entirety of the released topmost tier is located on the outfeed of the tilt hoist system, while still raising continuously the lumber stack, lowering the transition track until the upper surface of the transition track is substantially aligned with a lower surface of the subsequent topmost tier.

According to one embodiment, the transition track comprises a plurality of spaced-apart rails extending between the release location and the outfeed, each one of the rails being displaceable vertically by a transition track actuator.

According to one embodiment, the method further comprises detecting a board deformation of the topmost tier and adjusting a relative height of the rails using the detected board deformation of the topmost tier.

According to another aspect, there is provided a tilt hoist system for breaking down a lumber stack having a plurality of tiers of lumber. The tilt hoist system comprises:

a tilt hoist apparatus configured to tilt the lumber stack into an inclined orientation and to lift said lumber stack to successively bring a topmost tier thereof at a release location;

an outfeed comprising a conveyor configured to receive each tier of lumber from the tilt hoist apparatus and convey the same away from the tilt hoist apparatus; and a transition assembly for guiding each tier of lumber from the tilt hoist apparatus to the outfeed, the transition assembly comprising:

a transition track extending at a downward inclination and having a top end positioned to receive each tier of lumber from the tilt hoist apparatus, and a bottom end adjacent to the outfeed; and a transition track actuator to raise the transition track simultaneously with the lumber stack until the release location is reached and lower the transition track once the topmost tier is located on the outfeed.

According to one embodiment, the tilt hoist system further comprises one or more movable retaining arms configurable in a top end configuration wherein the retaining arms are positioned adjacent to the top end of the transition track and contact a longitudinal side edge of a front piece of lumber of the topmost tier of the lumber stack to receive and hold said topmost tier at the release location and a bottom end configuration wherein the retaining arms are positioned past the bottom end of the transition track, out of contact with the front piece of lumber upon reaching the bottom end of the track, thereby releasing the tier of lumber onto the conveyor of the outfeed; and a retaining arm actuator operatively connected to the retaining arms to move the retaining arms between the top and bottom end configurations.

According to one embodiment, the tilt hoist apparatus is configured to lift the lumber stack continuously.

According to one embodiment, the transition track comprises a plurality of spaced-apart rails extending between the release location of the tilt hoist apparatus and the outfeed and each one of the rails is vertically displaceable by the transition track actuator.

According to one embodiment, the transition track actuator comprises a first transition track actuator to displace each one of the rails independently of the other ones of the rails and a second transition track actuator to displace vertically all of the rails simultaneously.

According to one embodiment, the tilt hoist system further comprises at least one board sensor configured to monitor a board deformation of at least a portion of the topmost tier, the at least one board sensor being operatively connected to the first transition track actuator to adjust a relative height of the rails using the board deformation of the topmost tier monitored by the at least one board sensor.

According to one embodiment, the tilt hoist system further comprises a controller operatively connected to the tilt hoist apparatus and the transition track actuator.

BRIEF DESCRIPTION OF DRAWINGS

FIG. 13A is an enlarged side elevation view of the tilt hoist system of FIG. 2, including a lift and a lift safety mechanism operatively connected to the lift, in accordance with an embodiment, and FIG. 13B is a rear perspective view, enlarged, of the lift and the lift safety mechanism.

DETAILED DESCRIPTION

Figure 1:
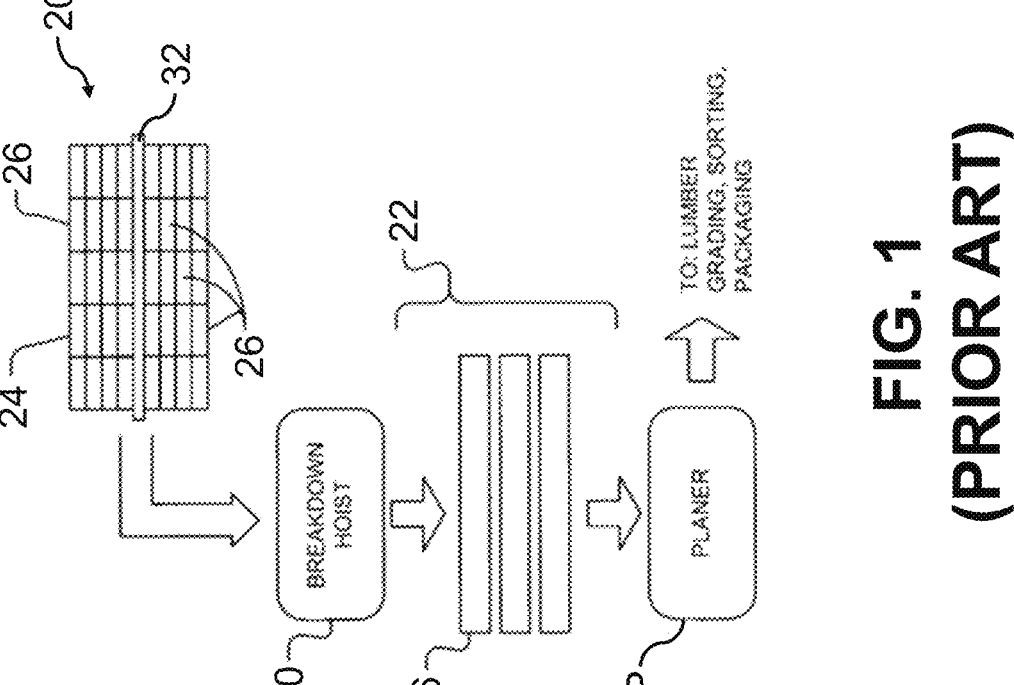
FIG. 1 is a schematic view of a wood milling operation including a stack of lumber, a breakdown hoist (i.e., a tilt hoist apparatus), and a planer, according to an implementation of the prior art.

The present disclosure describes a tilt hoist system 40 for breaking down a lumber stack 20 having a plurality of superposed tiers of lumber 22. Referring to the implementation shown in FIG. 2, the tilt hoist system 40 includes a tilt hoist apparatus 50 configured to tilt the lumber stack 20 (FIGS. 3A and 4A) into an inclined orientation and to lift the lumber stack 20 to successively bring a topmost tier 24 of the stack 20 at a release location 52 of the tilt hoist apparatus 50.

It will be noted that the term "topmost tier" 24, as may be used herein, is to be understood as meaning the tier 22 that that is positioned at the top of the lumber stack 20 at any given time. For example, if a stack 20 includes five tiers 22 layered on top of each other, then the fifth tier layered on top of all the other tiers 22 is considered the topmost tier 24. If the fifth tier is removed from the lumber stack 20, then the fourth tier situated underneath successively becomes the topmost tier 24. It should be noted that FIGS. 2 and 3A to 3C only show a single tier 22, which qualifies as the topmost tier 24 for the purpose of this disclosure.

It is appreciated that the tilt hoist system 40 can be used to convey the tiers 22 in a desired manner towards locations of additional timber processing, such as a planing of the lumber pieces 26 into substantially uniform lumber boards, grading, sorting and final packaging for delivery.

Tilt Hoist Apparatus 50

It should be noted that the art can refer to a system or assembly equivalent to the tilt hoist apparatus 50 as a "breakdown hoist", "tilt hoist", "unstacking system", or "tilt breakdown hoist", etc. The present disclosure means to integrate any version of the tilt hoist apparatus 50 disclosed in the art insofar that the version provided by the art can tilt at least one lumber stack 20 into an inclined orientation and lift the lumber stack 20 to successively bring the topmost tier 24 of the stack 20 at the release location 52. Depending on the implementation, the release location 52 can be embodied or bound by a "release position", "spilling edge" or a "top edge" as seen in the art.

It will be understood that the tilt hoist apparatus 50 can receive a lumber stack 20 (only the topmost tier 24 is shown in FIGS. 2 and 3A to 3C) of various arrangements, with or without spacers 32 between consecutive tiers, so long as it is composed of tiers 22 of pieces of lumber 26. Also, the "tilted" or "inclined" orientation of the lumber stack 20 provided by the tilt hoist apparatus 50 can be understood as a transitory state and does not need to be fixed into that orientation at all times during operation of the tilt hoist system 40. For example, in one implementation, the lumber stack 20 can be loaded onto the tilt hoist apparatus 50 in an upright/vertical orientation only to be later tilted into the inclined orientation. The inclined orientation can be understood as an inclination of the lumber stack 20 at an angle sufficient for the topmost tier 24 of the lumber stack 20 to slide off, for instance under the effect of gravity when the topmost tier 24 reaches the release location 52. Lastly, the release location 52 of the tilt hoist apparatus 50 can be understood as the position of the topmost tier 24 above an upper threshold T (FIGS. 3A and 4A) of the tilt hoist system 40 wherefrom the topmost tier 24 is able to slide when the lumber stack 20 is in the inclined orientation. It will be noted that the successive lift of the lumber stack 20 can be continuous, semi-continuous or incremental, as will be explained in more detail below.

Figure 2:
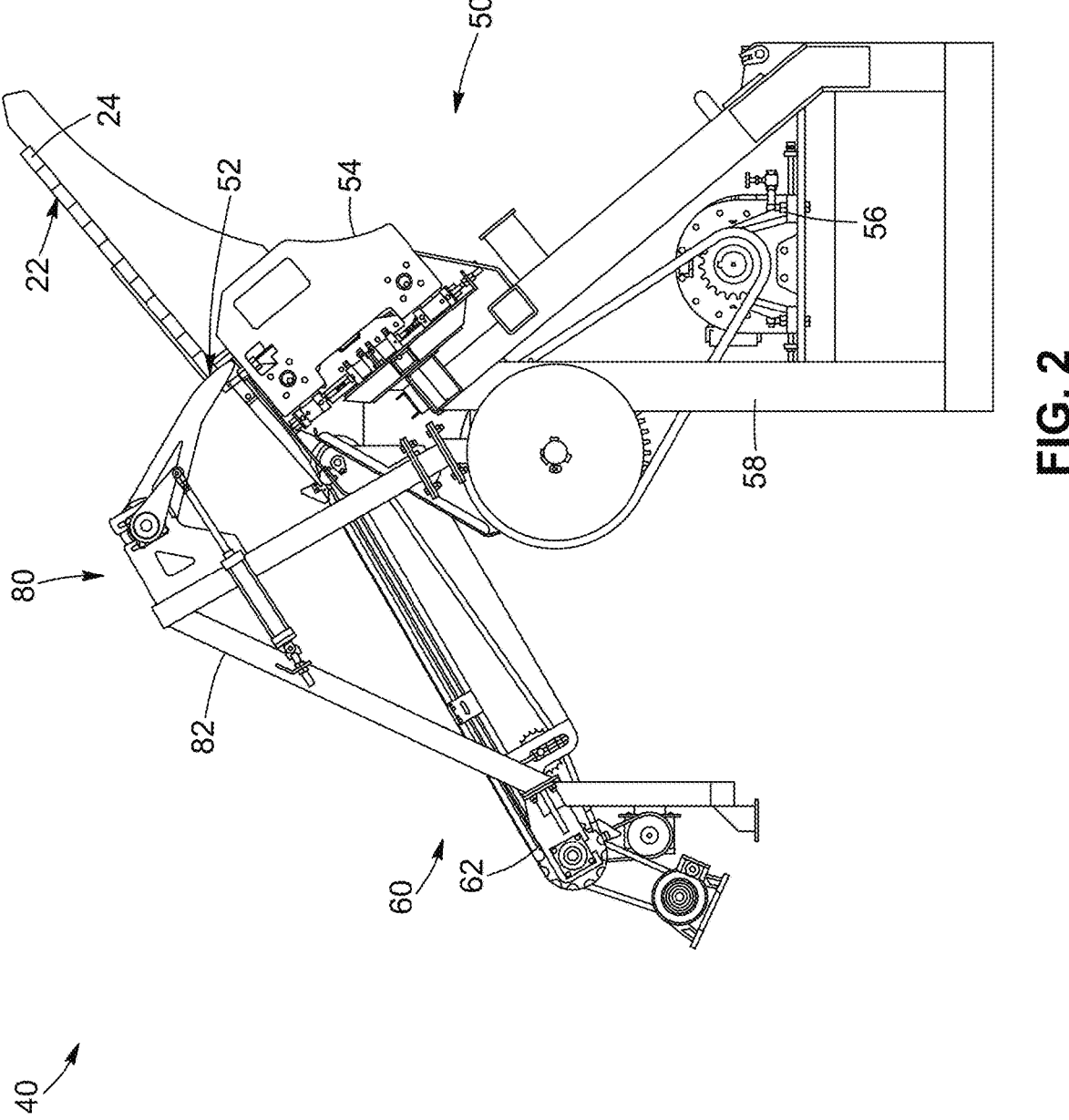
FIG. 2 is a side elevation view of a tilt hoist system, including a tilt hoist apparatus, an outfeed, and a transition assembly, located between the tilt hoist apparatus and the outfeed, in accordance with an implementation.

In the implementation shown in FIGS. 2 and 3A to 3C, the tilt hoist apparatus 50 includes a support base 58 and a lift 54, slidably mounted to the support base 58 and onto which the lumber stack 20 can be loaded. The lift 54 is configured to successively bring the lumber stack 20 to the release location 52 with a lifting mechanism 56 operatively connected thereto. According to the same implementation, the lift 54 is suitably connected to the support base 58 which provides a face (not visible) onto which the lift 54 can be raised or lowered. The lift 54 can be raised to a top position (FIGS. 2 and 3A to 3C) and a bottom position (not shown) from which the stack 20 can be loaded on the lift 54. Moreover, and as shown, the face of the support base 58 can be inclined such that the lift 54 connected thereto is also inclined, thus enabling the inclined orientation of the lumber stack 20. In FIG. 2, the topmost tier 24 is located at the release location 52. When a topmost tier 24 of lumber is brought to the release location 52 after having been raised by the lift 54, the topmost tier 24 can pass over the upper threshold T (FIG. 3A) to slide away from the tilt hoist apparatus 50.

Outfeed 60

Still referring to FIG. 2, according to one implementation, the tilt hoist system 40 further includes an outfeed 60 including one or more conveyors 62 configured to receive each tier of lumber 22 from the tilt hoist apparatus 50 and convey the same away from the tilt hoist apparatus 50. In the non-limitative implementation shown, the tilt hoist system 40 includes one conveyor 62.

Referring to the non-limitative implementation shown in FIGS. 4A to 4D, the conveyor 62 includes a plurality of spaced-apart conveyor lug chains 64 forming belts, five of which are shown all substantially parallel to each other by way of example. The parallel conveyor lug chains 64 may be inclined to convey the topmost tier 24 downwardly and away from the tilt hoist apparatus 50. It should be noted that gaps defined in between adjacent ones of the conveyor lug chains 64 can serve as evacuation apertures for the spacers 32 to fall into after each spacer 32 is successively released from the release location 52 as they slide down with the topmost tier 24. As mentioned, since each spacer 32 is configured crosswise to the pieces of lumber 26 in the tier 22, the spacers 32 are not conveyed by the conveyor 62 and will instead fall into the evacuation apertures.

Referring again to FIGS. 3A to 3C, and 4A to 4D, in some implementations, the conveyor 62 is provided with stoppers 66, extending upwardly from the conveyor lug chains 64, for instance, and configured to receive and support the topmost tier 24 from the tilt hoist apparatus 50, which can abut thereon. In the implementation shown in FIGS. 4A to 4D, each conveyor lug chain 64 includes two stoppers 66, such that for every half revolution of the conveyor lug chains 64, one stopper 66 is available proximate a top end (or input end) of the conveyor 62, i.e. the end closer to the tilt hoist apparatus 50. The stoppers 66 can be embodied by cleats, blocks, or protruding wedges. According to one non-limitative implementation and use, the stoppers 66 are used to catch and receive the topmost tier 24 from the tilt hoist apparatus 50 at an upstream end of the outfeed 60, which can be used as means to control the speed of the topmost tier 24 received on the conveyor 62 when transferred from the tilt hoist apparatus 50 to an output end of the conveyor 62.

In one alternative implementation (not shown), the one or more conveyors 62 of the outfeed 60 can include a sheeted planar surface positioned beneath and substantially parallel to the inclined orientation of the lumber stack 20 such that when the topmost tier 24 is received thereon, the topmost tier 24 is slidably conveyed away. In another contemplated implementation, the one or more conveyors 62 are embodied by a caterpillar conveyor or rollers. According to another implementation, the conveyors 62 can include a substantially horizontal planar frame with respect to the ground.

Still with reference to the implementation illustrated in FIG. 2, the conveyor 62 of the outfeed 60 is operatively connected to a motor adapted to drive the conveyor 62 such that the topmost tier 24 received thereon can be conveyed away from the tilt hoist apparatus 50 at a desired speed and/or distance. Further details about the position and configuration of the outfeed 60 are provided below and illustrated in the accompanying Figures.

Numerous examples can be found in the art of a tilt hoist apparatus 50 combined with or separated from the outfeed 60. It should therefore be understood that the tilt hoist apparatus 50 and the outfeed 60 can be implemented in any compatible manner that is known in the art.

Transition Assembly 80

With reference to the embodiment shown in FIGS. 2 and 3A to 3C, the tilt hoist system 40 further includes a transition assembly 80 to guide each tier of lumber 22 from the release location 52 of the tilt hoist apparatus 50 to the outfeed 60. Therefore, the transition assembly 80 is positioned between the tilt hoist apparatus 50 and the outfeed 60. It should be noted that the term "guide", as used herein, is to be understood as meaning that the transition assembly 80 enables a substantially controlled transition of each tier 22 of the lumber stack 20 from the tilt hoist apparatus 50 to the outfeed 60 according to a predetermined transition path and/or a suitable transition speed, such that the configuration of each tier 22 is substantially unaffected by its transition to the outfeed 60, as will be explained in more detail below.

Figure 3A:
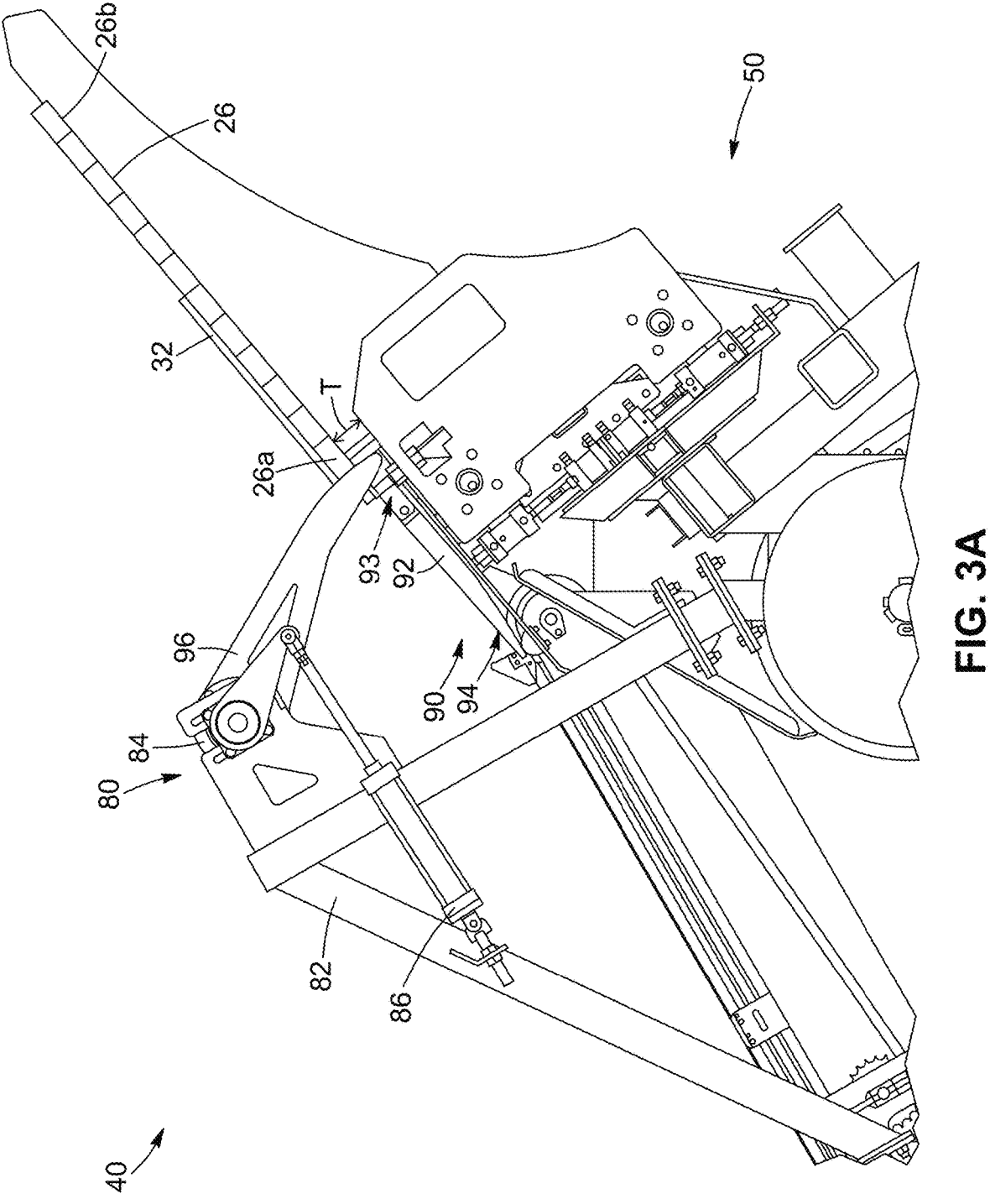
FIGS. 3A, 3B and 3C are each an enlarged side elevation view of the tilt hoist system shown in FIG. 2, wherein retaining arms of the transition assembly are configured in a top end configuration (FIG. 3A), an intermediate configuration (FIG. 3B), and a bottom end configuration (FIG. 3C), respectively.
Figure 3B:
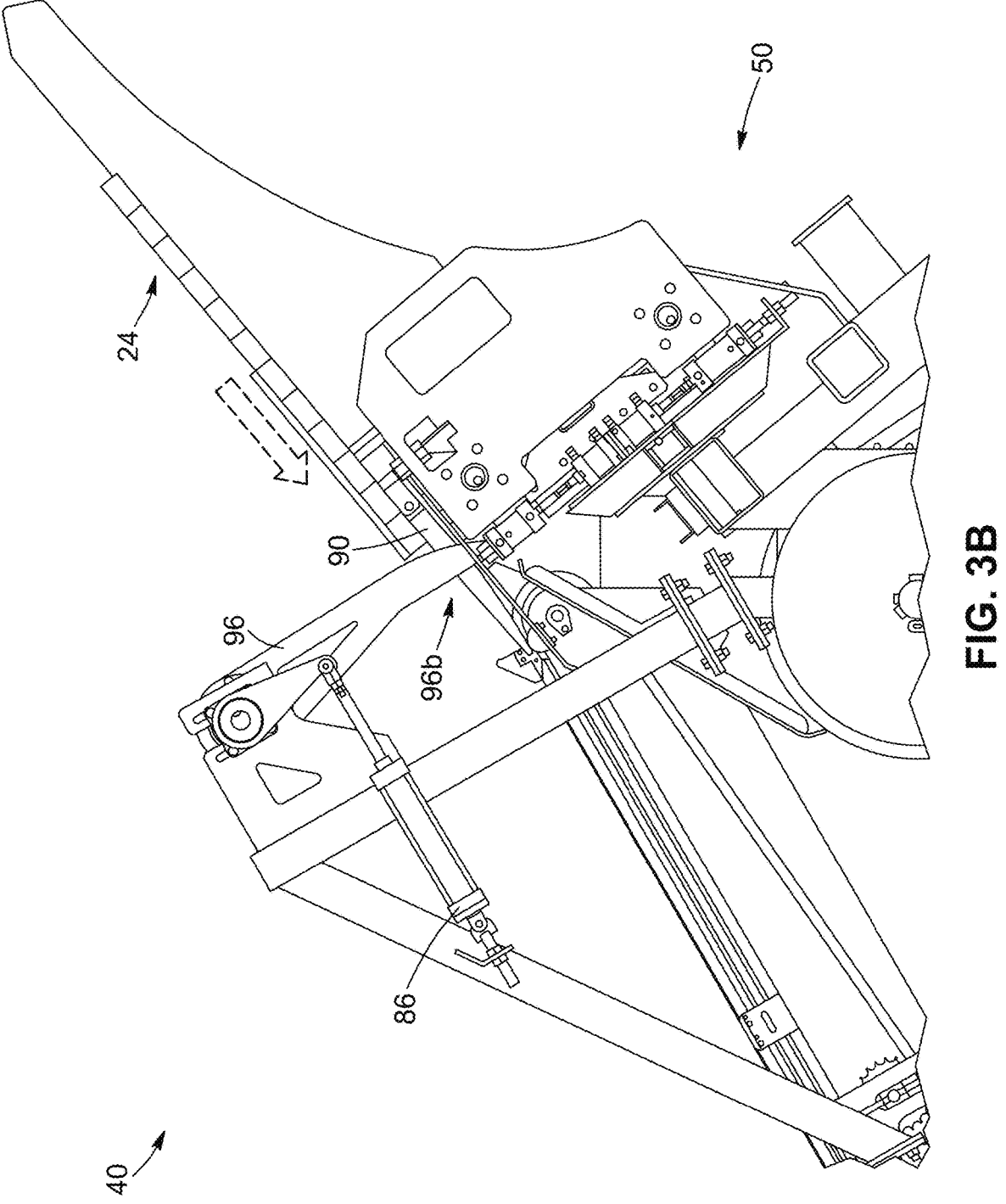
Figure 3C:
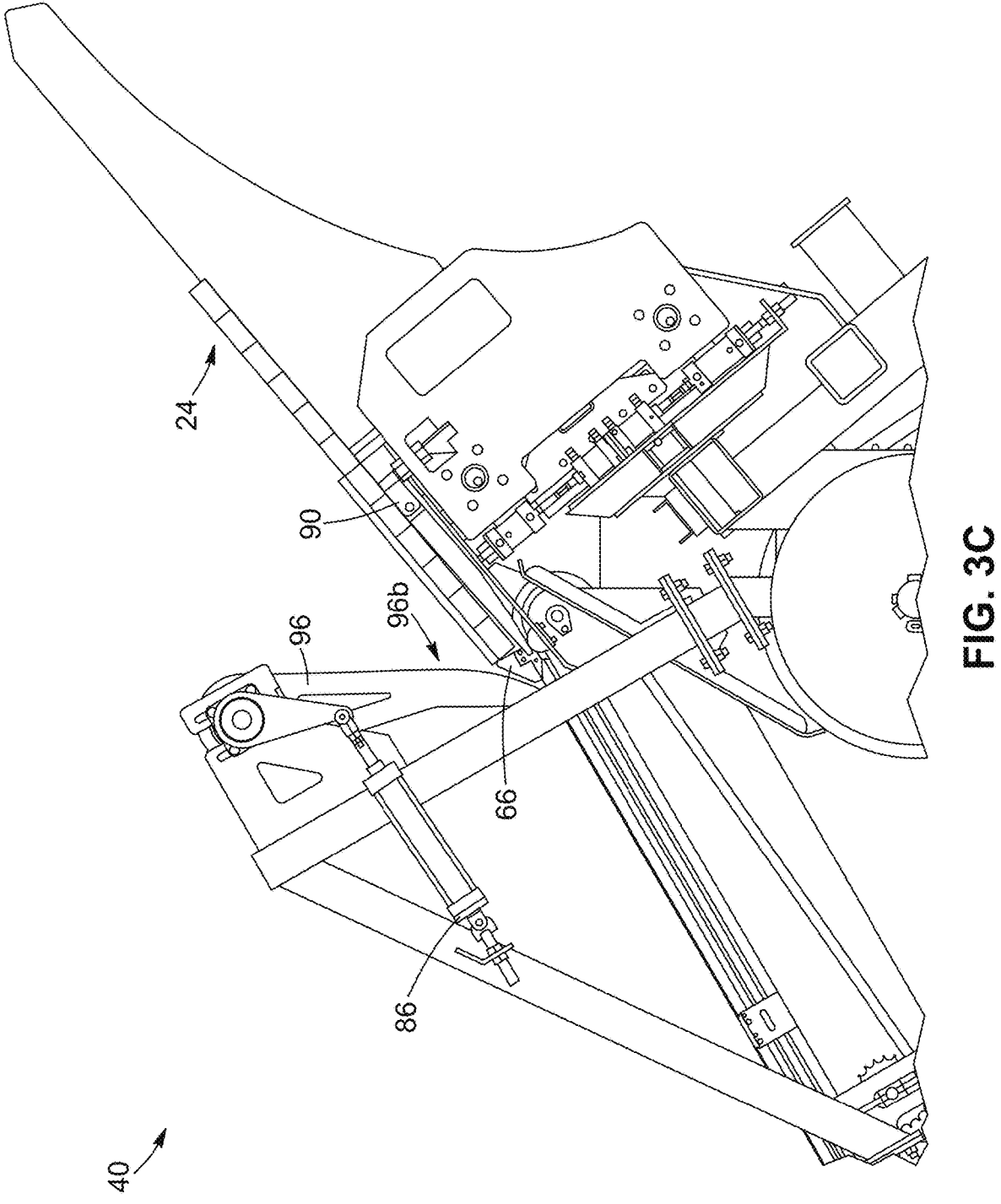

For transitioning the topmost tier 24 from the release location 52 of the tilt hoist apparatus 50 to the outfeed 60 according to the predetermined transition path and/or suitable transition speed, support means can be required. In the non-limitative implementation shown in FIGS. 2, 3A to 3C, and 4A to 4D, the transition assembly 80 includes a support frame 82 mounted to the support base 58 of the tilt hoist apparatus 50 and the outfeed 60, and a transition track 90 extending at a downward inclination between the release location 52 of the tilt hoist apparatus 50 and the input end of the conveyor 62. Referring to FIGS. 3A to 3C, the transition track 90 has a top (or input) end 93 positioned to receive each tier of lumber 22 from the tilt hoist apparatus 50, and a bottom (or output) end 94 adjacent to the outfeed 60. The transition track 90 thus provides support means for the topmost tier 24 to slide thereon. The respective positioning of the top end 93 and the bottom end 94 of the transition track 90 enables the lowering (i.e. sliding down) of the topmost tier 24 by virtue of gravity.

In the non-limitative implementation shown, the transition track 90 includes a plurality of spaced-apart rails 92. Each rail 92 extends longitudinally between the top end 93 to about the bottom end 94 of the track 90 (i.e., from about the input end of the outfeed 60). Specifically, in the non-limitative implementation shown and as better shown in FIGS. 4A and 4B, the transition track 90 includes six independent rails 92, spaced-apart transversally, i.e. normal to the transition path of the transition assembly 80 and the conveyance direction of the outfeed 60. Each rail 92 extends substantially parallel to one another and parallel to the transition path of the transition assembly 80. Each rail 92 has an upper planar profile to enable a transition of the topmost tier 24 thereon. It should be noted that in the implementation shown, the upper threshold T of the tilt hoist system 40 is defined by the non-continuous alignment of a top (or input) end of each one of the rails 92. In other words, a longitudinal side edge 28 of the front lumber 26a of the topmost tier 24 abuts against front edges of the rails 92 at the top (or input) end until the topmost tiers 24 is transferred to the outfeed 60. At this time, an actuator (not shown) of the tilt hoist apparatus 50 pushes the stack 20 upwardly for the topmost tier 24 to clear (i.e. to extend above) the front edges of the rails 92 and slide downwardly thereon, as will be described in more details below.

In the non-limitative implementation shown, a bottom (or output) end of the rails 92 is substantially aligned (i.e. in a same plane) with the conveyor 62 at the input end thereof.

In one implementation, each independent spaced-apart rail 92 can be connected to a height adjustment mechanism (not visible) about the bottom end 94 of the track 90 such that the downward inclination of the transition track 90 and/or the alignment of the threshold T can be adjusted.

It is appreciated that, in an alternative embodiment, the transition assembly 80 can be free of rails 92, as explained in more details below. For instance, a distance of the transition track 90, between the release location 52 and the outfeed 60 can be shorter.

Movable Retaining Arms 96

Referring to FIGS. 2 and 3A to 3C, to guide each tier 22 at least partially on the transition track 90, the transition assembly 80 further includes one or more movable retaining arms 96 (one visible) mounted to the support frame 82. Each moveable retaining arm 96 can be shaped and/or sized and/or positionable to retain the topmost tier 24 at the release location 52 and adapted to substantially guide the topmost tier 24 along the transition path on the transition track 90, from the top (input) end 93 to the bottom (output) end 94.

According to one non-limiting implementation shown in FIGS. 2 and 3A to 3C, each retaining arm 96 is pivotally mounted to the support frame 82. More particularly, the transition assembly 80 includes a shaft 84 mounted to the support frame 82 and rotatable about a rotation axis "X" (FIG. 4B), and a shaft actuator 86 (FIGS. 3A to 3C), mounted to the support frame 82 and operatively connected to the shaft 84 to engage same in a pivoting movement. In the non-limitative embodiment shown, the actuator 86 is embodied by a hydraulic or a pneumatic cylinder configurable into an extended configuration (exemplified in FIG. 3A), in which a distal end portion 96b (FIGS. 3B and 3C) of the retaining arm 96 shown is positioned adjacent to the top end 93 of the transition track 90, and a contracted configuration (exemplified in FIG. 3C) in which the distal end portion 96b of the retaining arm 96 is positioned adjacent to the bottom end 94 of the transition track 90.

The shaft 84 extends above the transition track 90, transversally in relation to the transition path. The location of the shaft 84 can vary from the embodiment shown, as explained in more details below. The retaining arms 96 are secured to the shaft 84 and pivot therewith. The position of the shaft 84 and a length of each retaining arm 96 are such that a free end (i.e., a tip of the distal end portion) of each retaining arm 96 can be positioned adjacent to the transition track 90, from the release location 52 of the tilt hoist apparatus 50 (as exemplified in FIGS. 3A and 4A) to the bottom end 94 of the transition track 90 (as exemplified in FIG. 3C). In the implementation shown, the distal end portion 96b of each retaining arm 96 extends below a tier-supporting surface of the transition track 90. The distal end portion 96b of each retaining arm 96 is configured to contact the longitudinal side edge 28 of the front lumber 26a of the topmost tier 24 and to guide same from the release location 52 of the tilt hoist apparatus 50 to the bottom end 94 of the transition track 90. In an alternative embodiment (not shown), the retaining arms 96 are detachably secured to the shaft, for instance to facilitate maintenance and/or retrofitting.

In the non-limitative implementation shown, the retaining arms 96 are mounted and distributed equidistant to each other along a longitudinal length of the shaft 84. Each retaining arm 96 has an elongated shape that narrows towards the distal end portion 96b configured to contact the longitudinal side edge 28 of the front piece of lumber 26a of the topmost tier 24. Specifically, the distal end portion 96b of the retaining arms 96 extends downwards below the upper threshold T when configured adjacent to the top end 93 of the transition track 90.

It is appreciated that alternative embodiments of the retaining arms 96 and/or the shaft 84 can be foreseen. For instance and without being limitative, the number, shape, configuration, and location of the retaining arms 96 can vary from the implementation shown. For example, the retaining arms 96 can be embodied by rods, elongated tubes, movable plates, or any piece onto which the longitudinal side edge 28 of the front piece of lumber 26a of the topmost tier 24 can abut. In an alternative embodiment (not shown), a proximal end portion of the retaining arms 96 can be located below the transition track 90 and extend upwardly to have the distal end portion 96b abutting the longitudinal side edge 28 of the front piece of lumber 26a of the topmost tier 24. The retaining arms 96 can be movable between the top end 93 and the bottom end 94 of the transition track 90 by translation instead of a pivoting movement. The retaining arm actuator 86 can vary from the hydraulic or pneumatic cylinder shown. For instance, the actuator 86 of the retaining arms 96 can include an electric motor to drive the movement of the retaining arms.

The tilt hoist system 40 can further include a transition assembly controller (not shown) operatively connected to the tilt hoist apparatus 50 and the transition assembly 80 to coordinate the displacement of the tiers 22 during a transition sequence of the topmost tier 24 between the tilt hoist apparatus 50 and the outfeed 60, as will be described in more details below.

Figure 4A:
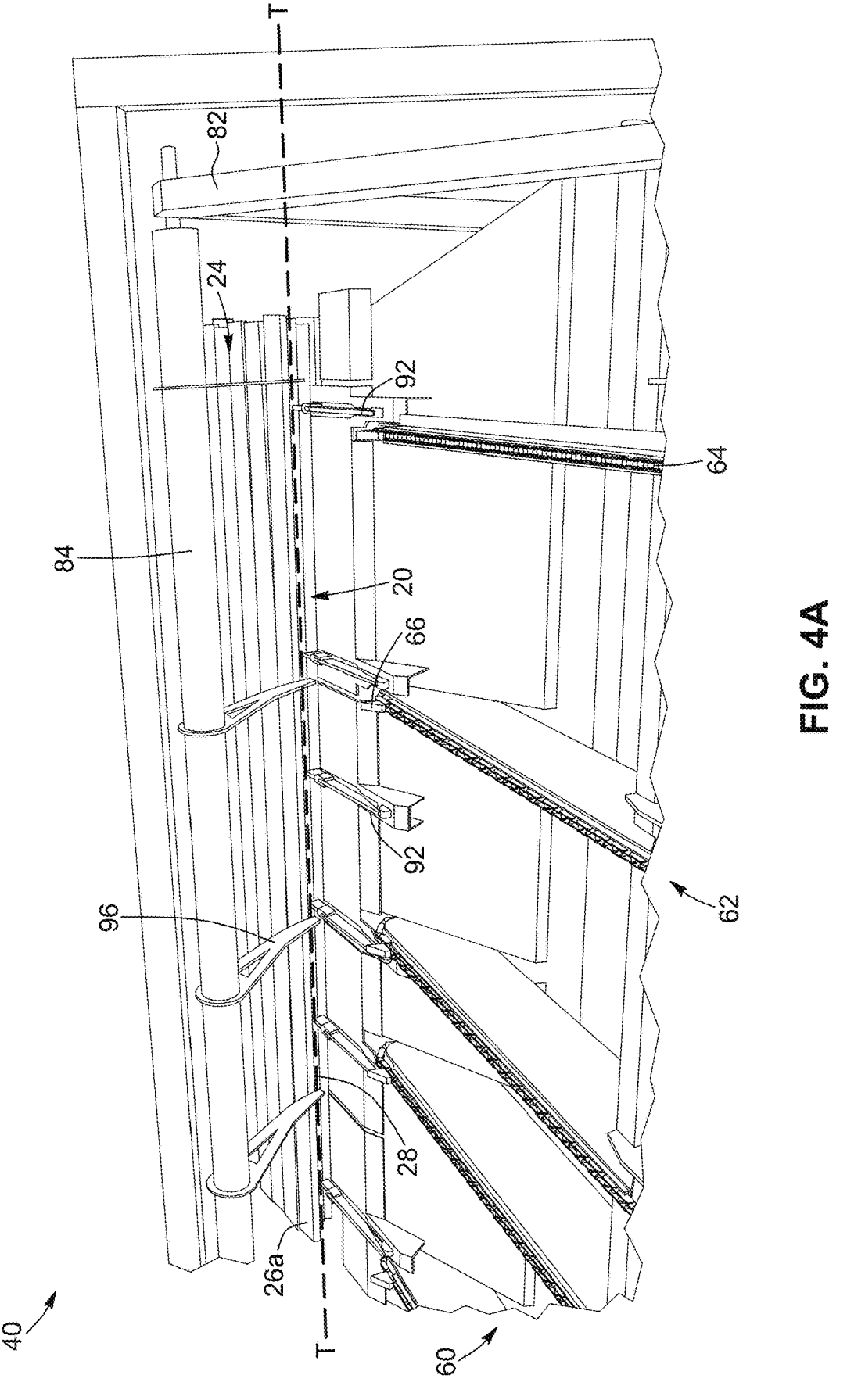
FIGS. 4A, 4B, and 4C are each a front perspective view of the tilt hoist system shown in FIG. 2, wherein the retaining arms are configured in the top end configuration (FIG. 4A), the intermediate configuration (FIG. 4B), and the bottom end configuration (FIG. 4C), respectively.
Figure 4B:
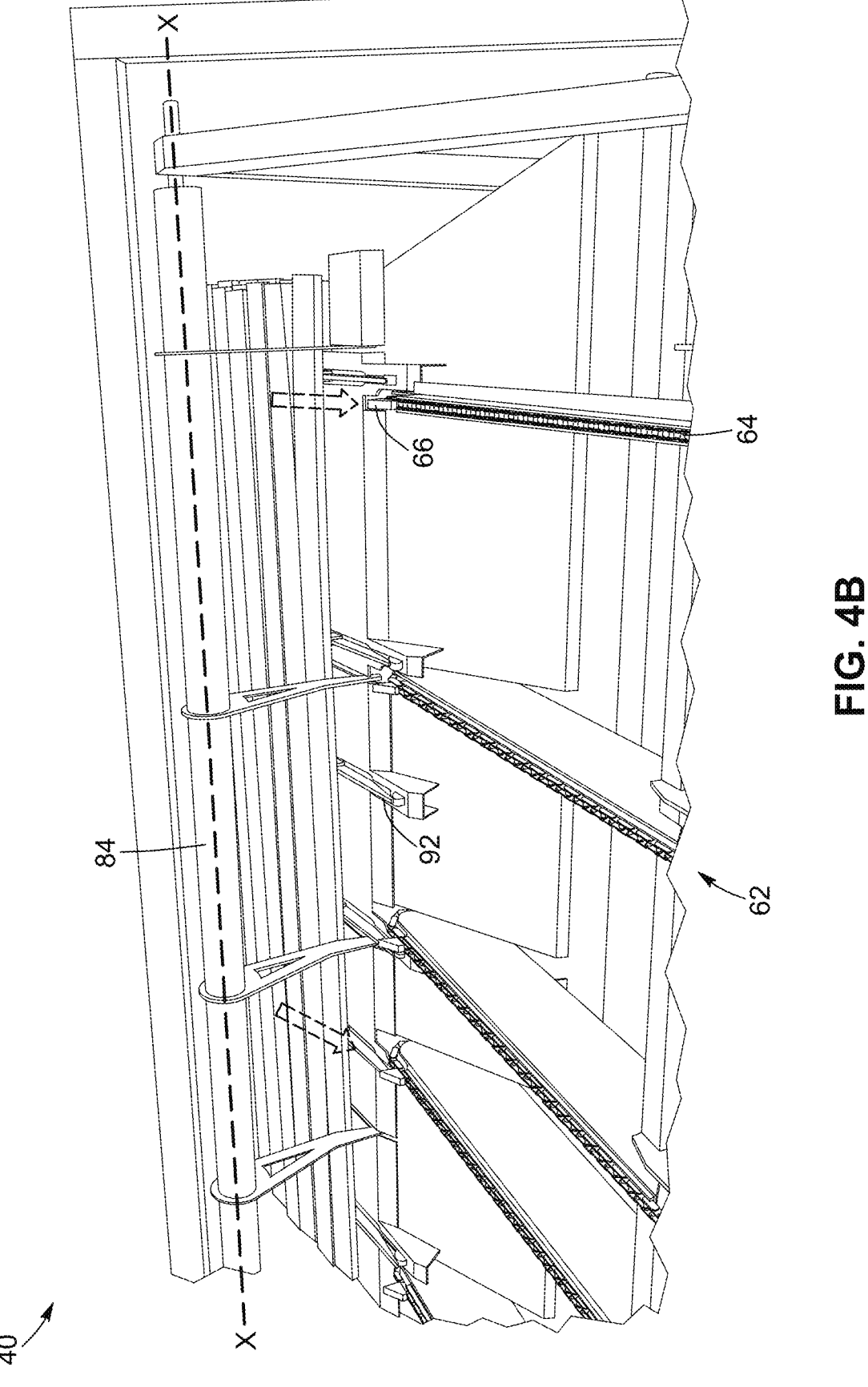

Referring now to the exemplary illustrations of FIGS. 3A to 3C and 4A to 4D, the transition sequence of the topmost tier 24 includes its transition from its release location 52 in the tilt hoist apparatus 50 (FIGS. 3A and 4A), i.e. wherein the longitudinal side edge 28 of the front lumber 26a of the topmost tier 24 is upstream the top end 93 of the transition track 90, to a configuration wherein the longitudinal side edge 28 of the front lumber 26a of the topmost tier 24 is at the bottom end 94 of the transition track 90 (FIG. 3C). FIGS. 3B and 4B show an intermediate configuration of the retaining arms 96 and the topmost tier 24, wherein the longitudinal side edge 28 of the front lumber 26a of the topmost tier 24 is just below/downstream the top end 93 of the transition track 90 and wherein a remaining portion of the topmost tier 24 is still supported by the lift 54 of the tilt hoist apparatus 50, after having been partially released from the release location 52 of the tilt hoist apparatus 50. The transition path of the topmost tier 24 is approximately represented by a dotted arrow.

At a beginning of the transition sequence, as exemplified in FIGS. 3A and 4A, the longitudinal side edge 28 of the front lumber 26a of the topmost tier 24 of the stack 20 abuts against the front edges of the rails 92 of the transition track 90. At this initial stage of the transition sequence, and in relation to the transition assembly 80, the retaining arms 96 are configured in a top end configuration such that the retaining arms 96 are positioned adjacent to the top end 93 of the transition track 90. Specifically, in the implementation shown of the top end configuration of the retaining arms 96, the distal end portion 96b of each retaining arm 96 is substantially aligned with (i.e., positioned behind) the upper threshold T defined by the non-continuous alignment of the top (or input) end of each one of the rails 92 of the track 90.

Therefore, in the top end configuration, the retaining arms 96 maintain and hold the topmost tier 24 at the release location 52. In the non-limitative embodiment shown, one set of the stoppers 66 of the conveyor 62 is located adjacent to the bottom end 94 of the transition track 90, ready to receive the topmost tier 24. The retaining arms 96 are distributed along a longitudinal length of the rotatable shaft 84, and the retaining arm actuator 86 is operatively connected to the shaft 84 and is configured to rotate the shaft 86 between angular orientations corresponding respectively to the top and bottom end configurations.

Then, as shown in FIGS. 3B and 4B, the lift 54 of the tilt hoist apparatus 50 is actuated to raise the topmost tier 24 above the front edges of the rails 92, i.e. above the threshold T defined by the transition track 90. At this stage, the topmost tier 24 is maintained at the release location 52 by the retaining arms 96. It is appreciated that, in an alternative embodiment (not shown), the rails 92 are adapted to be lowered to clear the longitudinal side edge 28 of the front lumber 26a of the topmost tier 24, as previously mentioned. The longitudinal side edge 28 of the front lumber 26a of the topmost tier 24 then solely abuts against the distal end portions 96b of the retaining arms 96. The retaining arm actuator 86 is then actuated and consequently the retaining arms 96 are pivoted towards the bottom end 94 of the transition track 90. Simultaneously, the topmost tier 24 slides downwardly, by gravity, towards the bottom end 94 of the transition track 90. Its translation speed is controlled and limited by the retaining arms 96 of the transition assembly 80, remain in contact with the longitudinal side edge 28 of the front lumber 26a. In other words, the translation speed of the topmost tier 24 is limited by a rotating speed of the shaft 84 as predetermined by the actuator configuration.

Figure 4C:
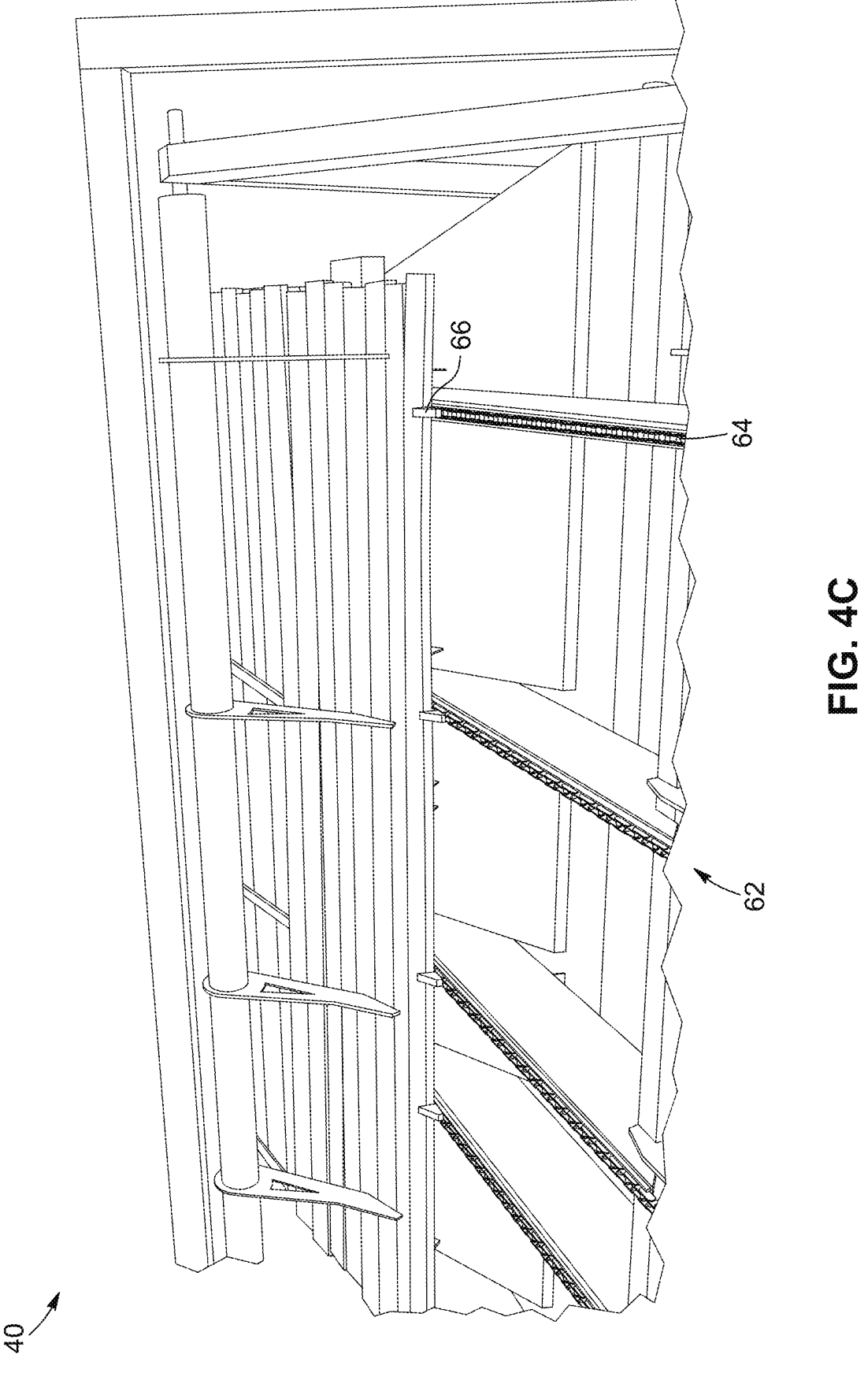
Figure 4D:
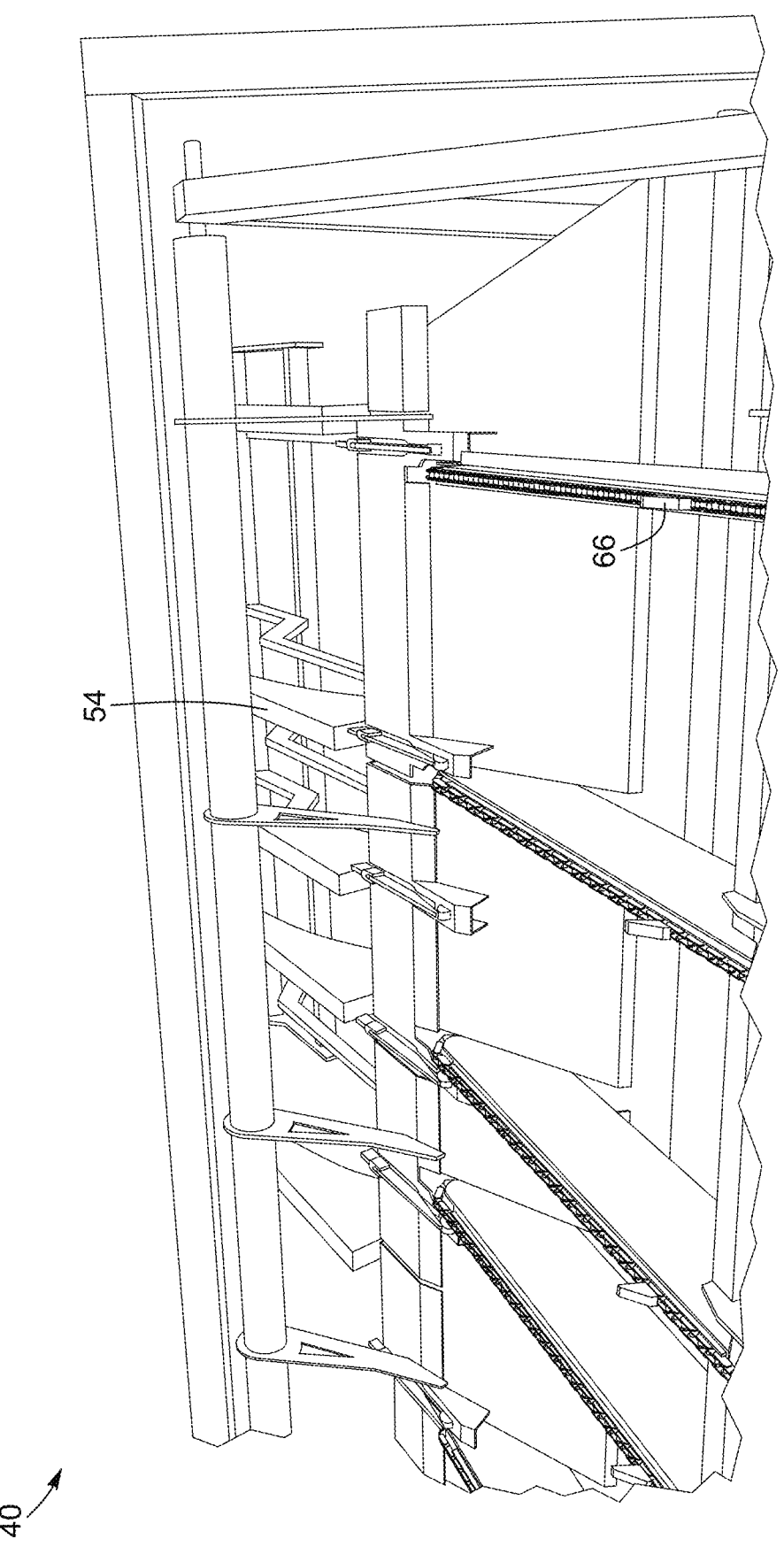
FIG. 4D is a front perspective view of the tilt hoist system shown in FIG. 2, wherein all pieces of lumber have been conveyed away from the tilt hoist system.

Referring to the implementation shown in FIGS. 3C and 4C, the retaining arms 96 are configured in a bottom end configuration such that the retaining arms 96 are positioned past the bottom end 94 of the transition track 90, out of contact with the front piece of lumber 26a, thereby releasing the topmost tier 24 of lumber 26 onto the conveyor 62 of the outfeed 60. If the retaining arms 96 are embodied by elongated arms mounted to the shaft 84 operatively connected to the retaining arm actuator 86, as shown, the retaining arms 96 are moved "past" the bottom end 94 of the track 90 and "out of contact" with the front lumber 26a by sufficiently rotating the shaft 84 clockwise with the retaining arm actuator 86. Therefore, when the longitudinal side edge 28 of the front lumber 26a of the topmost tier 24 reaches the bottom end 94 of the transition track 90, as shown in FIGS. 3C and 4C, the topmost tier 24 is released from the retaining arms 96 and the longitudinal side edge 28 of the front lumber 26a abuts against the stoppers 66 located at the upper end of the conveyor 62, adjacent to the bottom end 94 of the transition track 90. Once the topmost tier 24 is fully supported by the conveyor 62, the shaft 84 continues to rotate further clockwise (FIG. 4C) to further pivot the retaining arms 96 and move the distal end portion 96b thereof past the stoppers 66 of the conveyor 62 and away from the tilt hoist apparatus 50, such that the topmost tier 24 is free to abut on the stoppers 66. The conveyor 62 is then actuated to guide and control the displacement of the tier in the outfeed 60 (FIG. 4C).

Once a last/rear one of the lumbers 26 of the tier 22 is supported by the conveyor 62 and has cleared a trajectory of the retaining arms 96 (FIG. 4D), the shaft 84 can be rotated anticlockwise and the retaining arms 96 can be pivoted upwardly towards the top end 93 of the transition track 90 by the retaining arm actuator 86. Once the retaining arms 96 are configured adjacent to the release location 52 as shown in FIGS. 3A and 4A, i.e. in the top end configuration, a new transition sequence of the next topmost tier can begin. Thus, the transition sequence can be cyclically repeated, so that each tier 22 of the lumber stack 20 can be successively handled by the transition assembly 80.

The transition assembly controller can be operatively connected at least to the retaining arm actuator 86, the tilt hoist apparatus 50, and optionally the conveyor 62 to coordinate the displacement of the conveyor 62, the displacement of the lift 54 of the tilt hoist apparatus 50 and the movement of the retaining arms 96.

Between the positions adjacent to the top end 93 and the bottom end 94 of the transition track 90, i.e. between the top and bottom end configurations, the retaining arms 96 follow a trajectory, which in the non-limitative embodiment shown is arc-shaped when observed from a side elevation view (FIGS. 3A-3C). It is appreciated that, in an alternative embodiment, the trajectory can have another shape, such as substantially linear.

Movable Broken Retaining Arms 196

Figure 5:
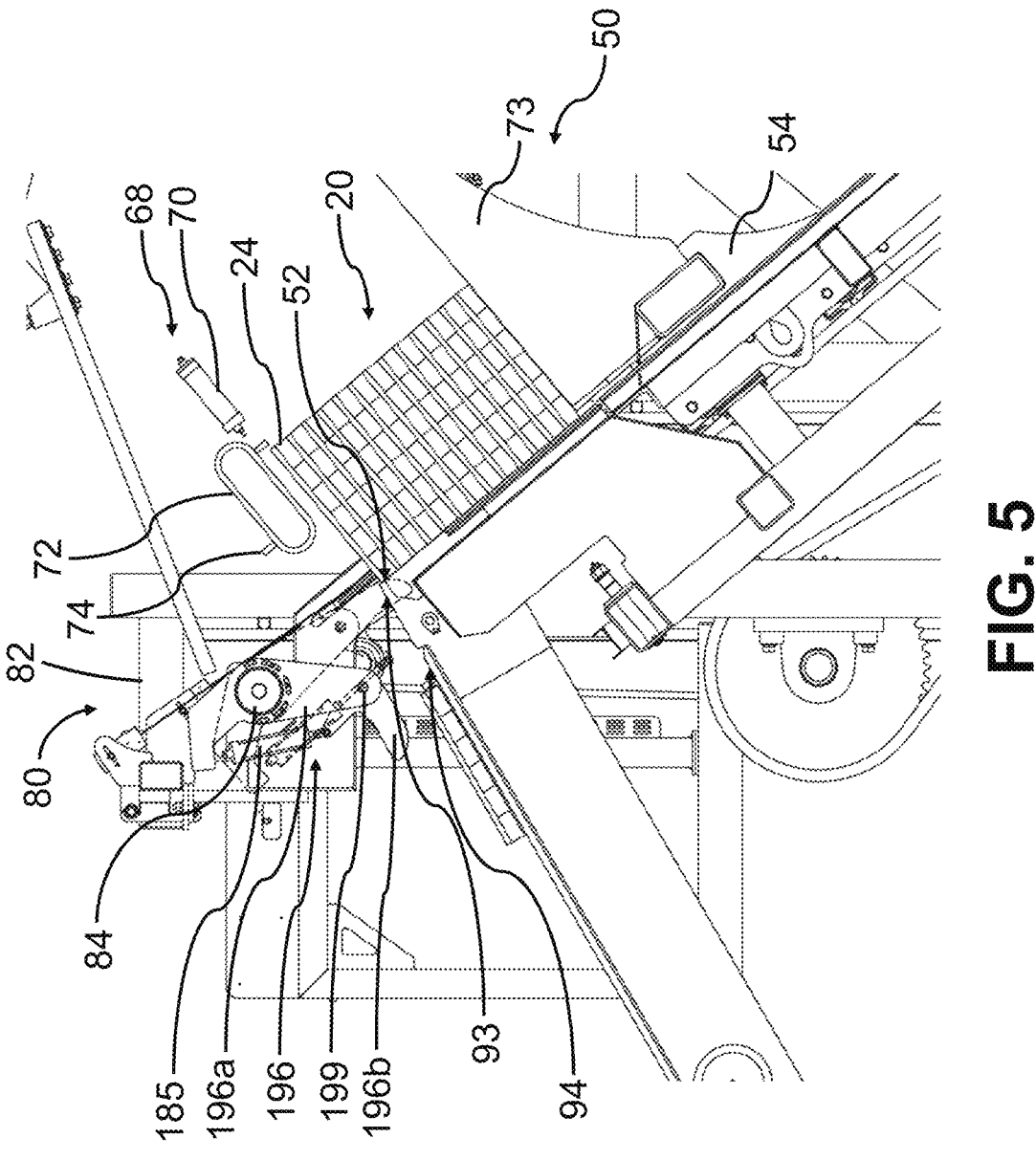
FIG. 5 is an enlarged side elevation view of the tilt hoist system in accordance with another embodiment, wherein the retaining arms include two pivotally-connected sections, and the transition assembly includes a second actuator operatively connected to a distal one of the pivotally connected sections.

FIG. 5 shows an alternative embodiment of the one or more retaining arms 96 (one visible), wherein the features are numbered with reference numerals in the 100 series which correspond to the reference numerals of the previous embodiment. Each one of the retaining arms 196 (only one is shown) is divided into two sections and can be qualified as "broken": a proximal section 196a secured to the shaft 84 and rotating therewith and a distal section 196b including the distal end portion abuttable against the longitudinal side edge 28 of the front piece of lumber 26a of the topmost tier 24. The distal section 196b is pivotally mounted to the proximal section 196a at a pivot axis 199. The transition assembly 80 further includes a second retaining arm actuator 185, in addition to the shaft actuator 86 (i.e., first retaining arm actuator 86). The second retaining arm actuator 185 is operatively connected to the distal section 196b of the broken retaining arm 196 and activatable to pivot the distal section 196b with respect to the proximal section 196a about the pivot axis 199. In the non-limitative embodiment shown, the second retaining arm actuator 185 comprises a hydraulic or pneumatic cylinder having a first end connected to the proximal section 196a and a second end connected to the distal section 196b of the broken retaining arm 196. The hydraulic or pneumatic cylinder is selectively configurable between an extended configuration and a compacted configuration (both configurations being shown superposed in FIG. 5, with the extended configuration being illustrated in dotted lines). In the extended configuration, a longitudinal axis of the distal section 196b is substantially aligned with the longitudinal axis of the proximal section 196a, while, in the compacted configuration, the distal section 196b extends substantially normal to the proximal section 196a. In an alternative embodiment, the first end of the hydraulic or pneumatic cylinder is connected to the support frame 82 instead of the proximal section 196a, and the second end is connected to the distal section 196b.

At this initial stage of a transition sequence, and in relation to the transition assembly 80, the broken retaining arms 196 are configured in a top end configuration such that the broken retaining arms 196 are positioned adjacent to the top end 93 of the transition track 90. Specifically, in the top end configuration, the broken retaining arms 196 maintain and hold the topmost tier 24 at the release location 52. Moreover, the second retaining arm actuator 185 is configured in the extended configuration, corresponding to the extended configuration of the broken retaining arms 196.

The second retaining arm actuator 185 and, consequently, the broken retaining arms 196 remain in the extended configuration until reaching the bottom end configuration of the retaining arms 196, i.e. wherein the broken retaining arms 196 are positioned past the bottom end 94 of the transition track 90, out of contact with the front piece of lumber 26*a*, thereby releasing the topmost tier 24 onto the conveyor 62 of the outfeed 60. In one embodiment, to configure the broken retaining arms 196 from the top end configuration to the bottom end configuration, the shaft 84 is rotated by the first retaining arm actuator 86 in a first rotation direction (clockwise from the perspective of FIG. 5). Once the bottom end configuration is reached, the retaining arms 196 are configured in a compacted configuration by configuring the second retaining arm actuator 185 in the compacted configuration. Subsequently or simultaneously, the shaft 84 is rotated by the first retaining arm actuator 86 in a second rotation direction, opposed to the first rotation direction (counterclockwise from the perspective of FIG. 5) to return the retaining arms 196 to the top end configuration, wherein they are configured in the extended configuration to retain and guide a subsequent topmost tier 24.

The broken retaining arm 196 is an alternative embodiment to the retaining arm 96 shown in FIGS. 2, 3A to 3C, and 4A to 4D, allowing a quicker return to the top end configuration from the bottom end configuration and, thereby achieving quicker transition cycles. The retaining arms 96 can be pivoted from the bottom end configuration to the top end configuration only when the topmost tier 24 of lumber 26 is fully supported by the conveyor 62 and out of contact with the retaining arms 96 (see FIG. 4D). In contrast, the broken retaining arms 196 can be pivoted from the bottom end configuration to the top end configuration, even before the tier 24 of lumber is fully supported by the conveyor 62, thereby decreasing the time required to perform a complete transition sequence. In other words, a trajectory of the broken retaining arms 196 returning to the top end configuration in the compacted configuration does not cross with the transition path of the topmost tier 24, thereby avoiding or limiting interference between the topmost tier 24 and the distal section 196*b* of the retaining arms 196.

Figure 6B:
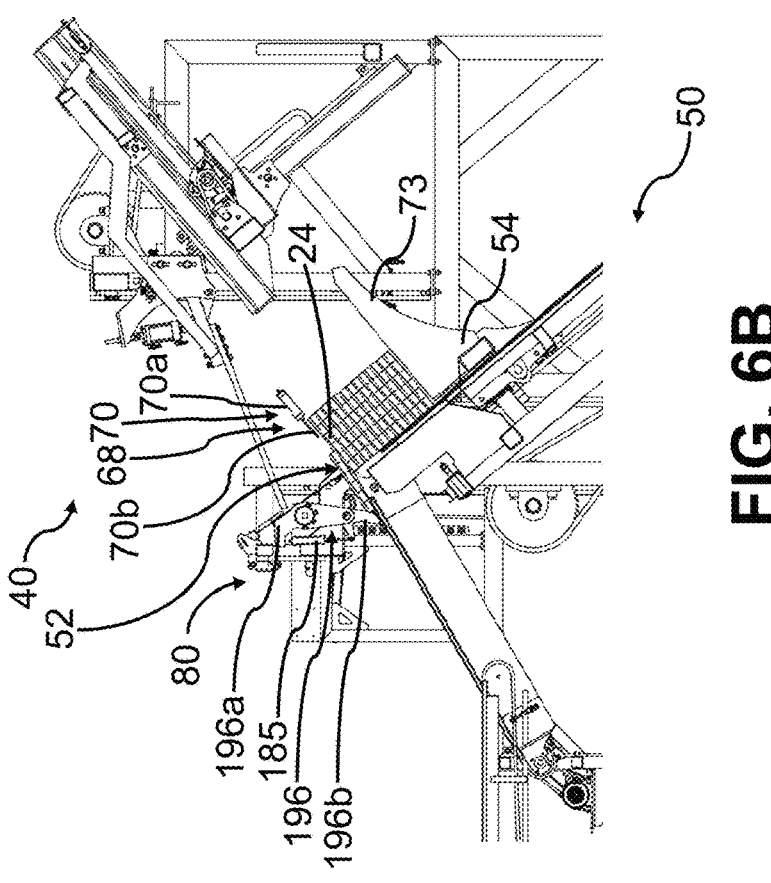
FIGS. 6A and 6B are each a side elevation view of a tilt hoist system in accordance with yet another embodiment, wherein the transition assembly includes tier pushers, wherein the tier pushers are configured in a distal configuration (FIG. 6A) and a proximal configuration (FIG. 6B), respectively.
Figure 6A:
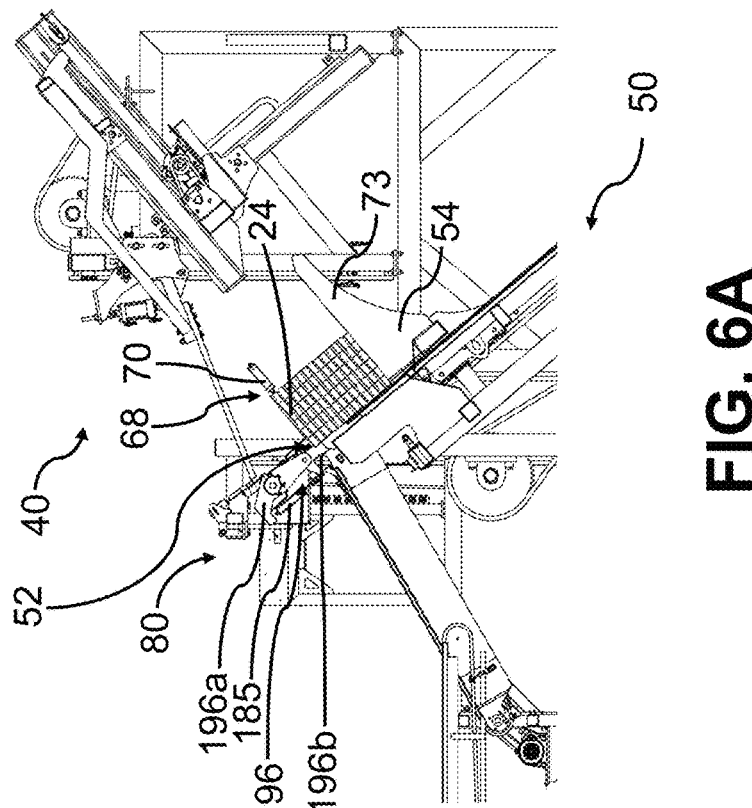

In an alternative embodiment (not shown), it is appreciated that the broken retaining arm 196 can have more that two arm sections or segments pivotally connected together, and that the actuator can vary from the second retaining arm actuator 185 shown in the FIGS. 5, 6A, and 6B.

In still an alternative embodiment (not shown), the transition assembly 80 can include two or more sets of retaining arms 196 to further increase the processing speed of the tilt hoist system 40. For instance, if the transition assembly 80 includes two sets of retaining arms 196, each one of the sets can be used every two topmost tiers of lumber. Once a first one of the two or more sets of retaining arms 196 is in contact with a tier 24 of lumber, a second one of the sets of retaining arms 196 can return from the bottom end configuration to the top end configuration and be configured in the extended configuration to perform the transition sequence of a subsequent tier of lumber. Thus, the retaining arms 196 of the first one of the two or more sets are configurable in the extended and compacted configurations and in the top and bottom end configurations independently from the retaining arms of the second one of the sets.

According to yet another alternative embodiment implementing the two or more sets of retaining arms operating at different stages as previously described, the lift 54 of the tilt hoist apparatus 50 can be configured to translate upwardly continuously or semi-continuously (i.e. by sequential increments), that is without incremental stops of the lift 54 to wait for a single set of retaining arms 96 to return to the top end configuration before raising the next topmost tier to the release location 52. Thus, according to one non-limiting mode of the transition sequence, a first set of broken retaining arms 196 is configured in a top end configuration to hold the topmost tier 24 at the release location 52 brought by the lift 54 of the tilt hoist apparatus 50, as previously explained. Then, as the first set of broken retaining arms 196 is configured into the bottom end configuration to allow the conveyance of the topmost tier 24 to the outfeed 60, a second set of broken retaining arms 196 is simultaneously configured to the top end configuration in a compacted configuration to avoid interfering with said transitioning topmost tier 24. During this time, the lift 54 uninterruptedly continues to operate to successively bring up the next topmost tier of the stack 20 to the release location 52. Once the next topmost tier 24 reaches the release location 52, the second set of retaining arms 196 is already configured in the top end configuration and in the extended configuration so that said topmost tier 24 may abut on the distal section 196*b* thereof before beginning a new transition sequence. It is appreciated that to achieve this operation, a speed of configuration of the two sets of broken retaining arms 196 should correspond to a speed of translation of the lift 54 of the tilt hoist apparatus 50. Thus, the transition sequence can be repeated by coordinating the two sets of broken retaining arms 196 via the transition assembly controller, for instance. It is appreciated that a continuous or semi-continuous lift operation of the tilt hoist apparatus 50 can increase the overall processing speed of the tilt hoist system 40.

In an embodiment, the retaining arms 196 of the two or more sets are operatively connected to different shafts 84 and/or retaining arm actuators 86 to be configured in the top and bottom end configurations at different stages.

Pusher or Dagger Assembly 68

Turning now to FIG. 5, in an embodiment, the transition assembly 80 further includes a pusher or dagger assembly 68 to push or pull at least a rear lumber 26*b* of the topmost tier 24 in direction of the outfeed 60, when the topmost tier 24 is released from the release location 52 of the tilt hoist apparatus 50.

In the embodiments shown in FIGS. 5 to 6B, the pusher or dagger assembly 68 includes a plurality of spaced-apart tier pushers 70 (only one is shown) mounted to the support base 58 or any other frame section of the tilt hoist system 40, located behind the lumber stack 20. The tier pushers 70 are configurable between a distal configuration (FIGS. 5 and 6A) and a proximal configuration (FIG. 6B). More particularly, in the proximal configuration, the tier pushers 70 are configured to push the rear lumber of the topmost tier 24 along a plane defined by the inclined topmost tier 24 at the release location 52. The tier pushers 70 contact a rear lumber 26*b* of the topmost tier 24 and are configured to push the topmost tier 24 in direction of the outfeed 60.

Therefore, the tier pushers 70 control the rear lumber 26*b* of the topmost tier 24 to maintain the tier as an assembled unit (i.e. a uniform and/or continuous row of boards 26 extending substantially parallel to each other). Therefore, the transition assembly 80 does not rely solely on gravity to maintain the topmost tier 24 as an assembled unit. As the topmost tier 24 starts to slide down, retained by the retaining arms 96, 196, the pushers 70 apply pressure on the rear lumber 26*b* of the topmost tier 24 and pushes the topmost tier 24 towards the conveyor 62.

The tier pushers 70 can be operatively connected to the transition assembly controller. The transition assembly controller can be configured to coordinate and more particularly to synchronize the movement of the retaining arms 96, 196 from the top end configuration to the bottom end configuration with the action of the tier pushers 70 (or the pusher or dagger assembly 68) from the distal configuration to the proximal configuration.

In the embodiment shown, the tier pushers 70 include a main body 70a and a translatable arm 70b (see FIG. 6B), translatable with respect to the main body 70a and configurable in a compacted configuration (FIG. 6A) wherein the translatable arm 70b is at least partially housed in the main body 70a, corresponding to the distal configuration of the tier pusher 70, and an extended configuration (FIG. 6B), wherein the translatable arm 70b extends at least partially outward of the main body 70a, corresponding to the proximal configuration. The length of the translatable arm 70b shown in FIG. 6B is illustrative and can vary from the embodiment shown. In one alternative embodiment (not shown), the translatable arm 70b has an increased length compared to the embodiment of FIG. 6B sufficient to push the rear lumber 26b of the topmost tier 24 until the tier fully clears the release location 52, for instance. In an alternative embodiment (not shown), the tier pusher(s) 70 can be translatable between the distal and the proximal configurations.

In one embodiment, tier pushers 70 have an adjustable stroke between the distal and the proximal configurations. In one embodiment in which the tiers pushers 70 are operatively connected with the transition assembly controller as previously mentioned, the transition assembly controller can be particularly configured to control the extent of the stroke of the tier pushers 70. In an alternative embodiment, the tier pushers 70 can be disactivated mid-stroke if an unsafe or undesirable event is detected by board sensors, as explained in more details below.

Referring back to FIG. 5, in an alternative embodiment, the pusher or dagger assembly 68 further includes an endless transmission unit 72, such as a chain, a belt or a carriage assembly, located above the topmost tier 24 in the release position 52 and in contact with at least a portion thereof including the rear lumber 26b to drag the topmost tier 24 in direction of the outfeed 60. Therefore, the endless transmission unit 72 is engageable in rotation when the topmost tier 24 is being released from the release location 52 of the tilt hoist apparatus 50 to ensure that the tier remains assembled, with the boards 26 extending substantially parallel to one another, during the transition sequence. In the non-limitative embodiment shown, the endless transmission unit 72 includes lugs 74 protruding from an outer surface thereof and engageable with the rear lumber 26b of the topmost tier 24 and rotatable, when engaged therewith, in direction of the outfeed 60. In the embodiment shown, the chain/belt of the endless transmission unit 72 is engaged in rotation by the tier pushers 70 contacting and pushing the lugs 74 when configured in the proximal configuration. In an alternative embodiment, the endless transmission unit 72 is operatively connected to an independent actuator to be engaged in rotation.

Figure 7:
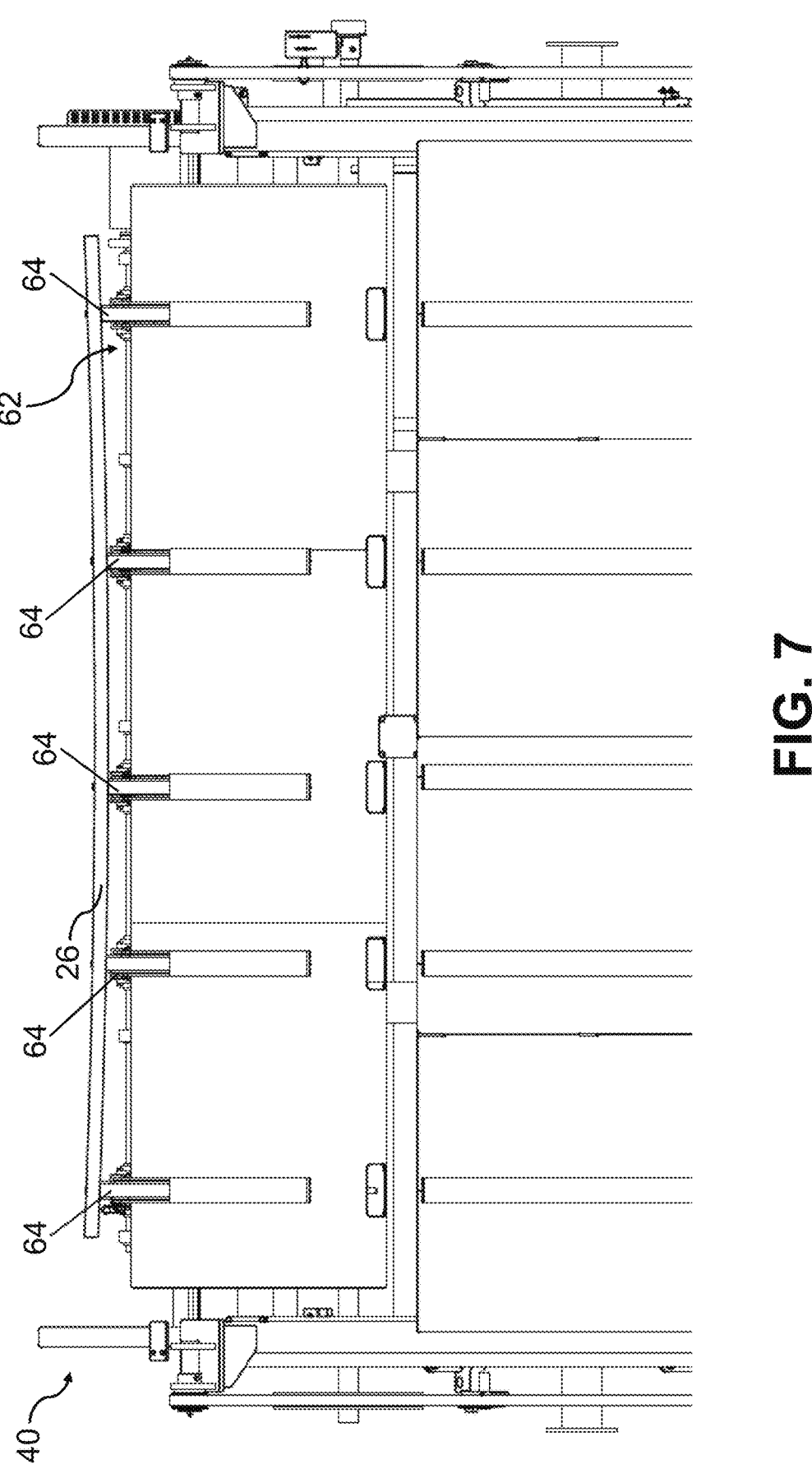
FIG. 7 is a front elevation view of a tilt hoist system in accordance with another embodiment, showing an uneven board at a release location of the tilt hoist apparatus, and wherein chains of a conveyor of the outfeed are adjustable in height.
Figure 8:
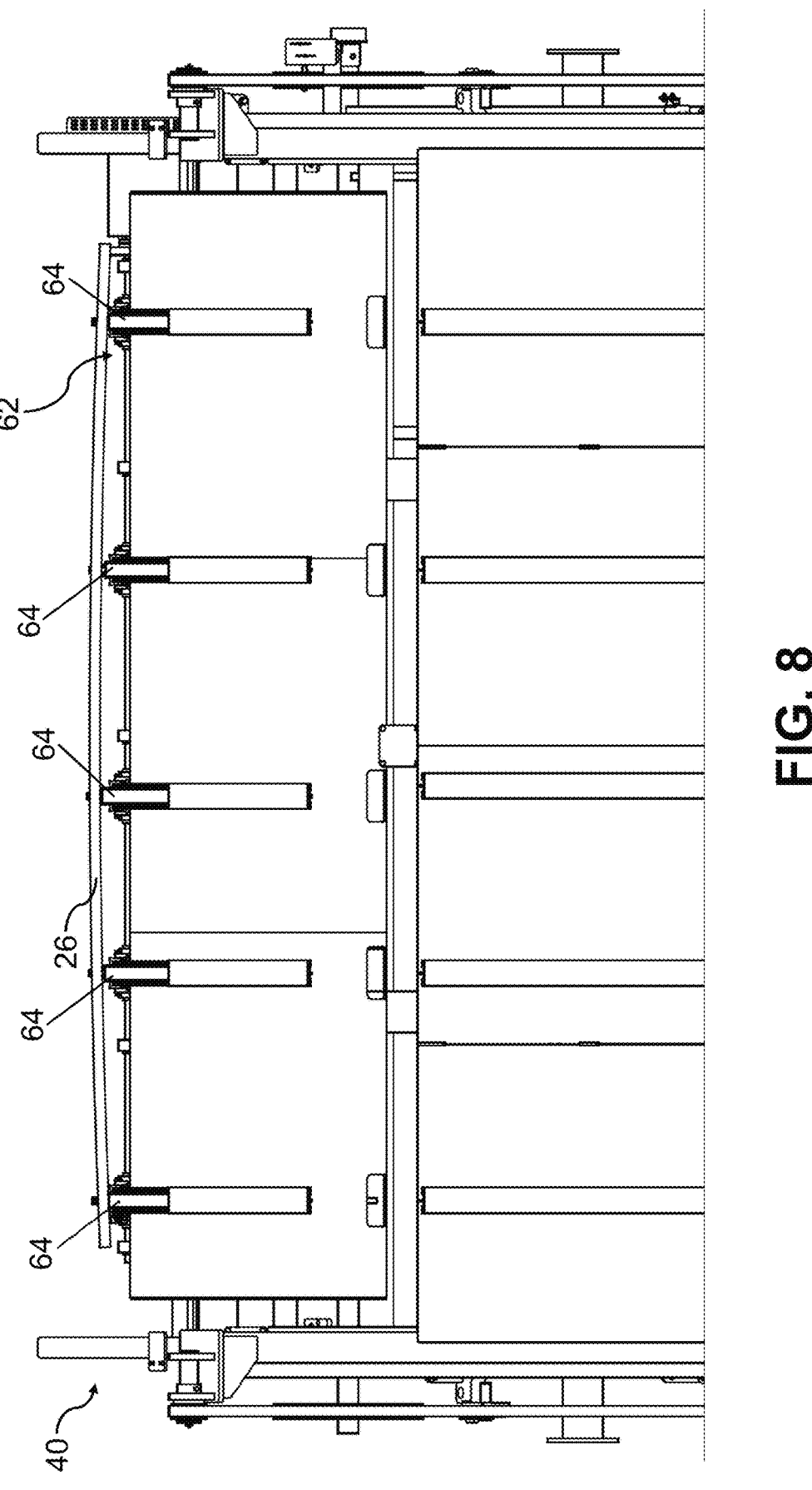
FIG. 8 is another front elevation view of the tilt hoist system of FIG. 7, including the height adjustable conveyor chains, and showing another uneven board at the release location of the tilt hoist apparatus.
Figure 9:
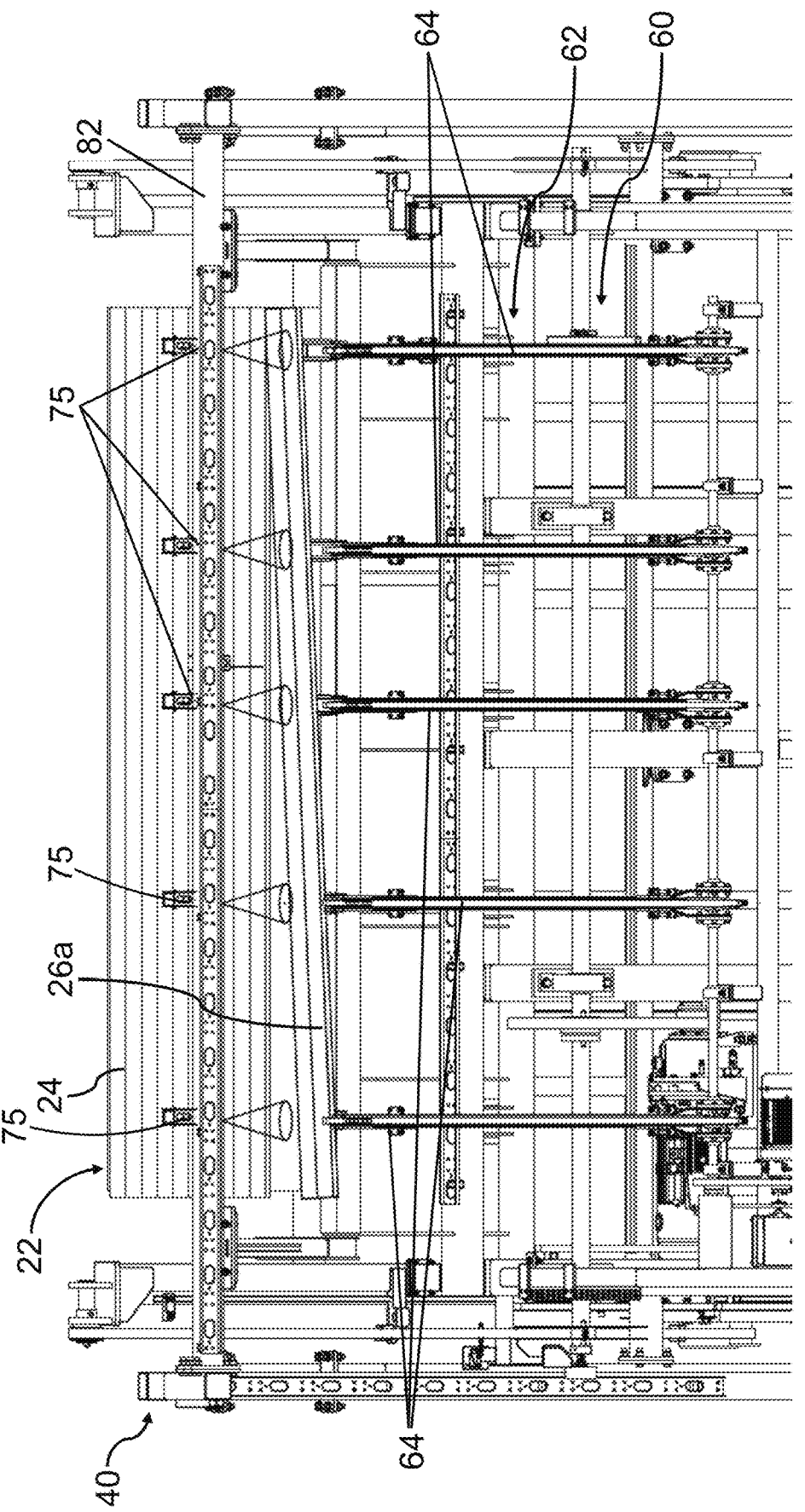
FIG. 9 is a top plan view of the tilt hoist system shown in FIG. 7, including board sensors.

Referring now to FIGS. 7 to 9, there is shown an embodiment wherein the tilt hoist system 40 is free of rails 92 extending between the release location 52 and the outfeed 60 and, more particularly, the conveyor 62 of the outfeed 60. In the embodiment shown, the conveyor 62 includes a plurality of spaced-apart conveyor chains 64, five of which are shown all substantially parallel to each other by way of example.

The conveyor chains 64 shown in FIGS. 7 to 9 are similar to the conveyor chains 64 shown in FIGS. 4A to 4C, except that with the absence of rails 92, the conveyor chains 64 extend adjacently from the release location 52 of the tilt hoist apparatus 50 so as to allow the reception of the topmost tier 24. In the non-limitative embodiment shown, the conveyor chains 64 are lug chains, i.e. conveyor chains having spaced-apart lugs protruding outwardly. The parallel conveyor chains 64 may be inclined in such a way to convey the topmost tier 24 downwardly and away from the tilt hoist apparatus 50.

In the embodiment shown in FIGS. 7 to 9, a distance between the release location 52 and an input location of the outfeed 60, i.e. an upper end of the conveyor chains 64 of the conveyor 62, is shorter than in the above-described embodiments including the rails 92. Each one of the conveyor chains 64 is individually adjustable in height, or at least an upper section thereof, to fit a shape of uneven boards 26 of a tier 22, as shown in FIGS. 7 and 8. Therefore, the transition assembly 80 includes a plurality of board sensors 75, such as optical sensors (e.g. cameras, lasers, etc.) and the like (FIG. 9), capable of and configured for sensing wood deformation (unevenness). In one embodiment, the board sensors 75 are operatively connected with conveyor actuators (not visible) configured to selectively raise or lower the height of each conveyor chain 64. The conveyor actuators are connected to a conveyor controller to process wood deformation data captured by the board sensors 75, as explained in more details below. In the non-limitative embodiment shown in FIG. 9, the plurality of board sensors 75 is mounted to the support frame 82, above the release location 52, with a field of view towards at least the first front boards of the topmost tier 24. At least one of the board sensors 75 and at least one of the conveyor actuators is associated to each one of the conveyor chains 64, as shown in FIG. 9. It is appreciated that the board sensor configuration can vary from the embodiment shown in FIG. 9.

It is appreciated that the transition assembly controller and the conveyor controller can be embodied in the same control unit or in different control units. It is appreciated that, in an alternative embodiment, the transition assembly 80 can include only one board sensor 75.

In one embodiment, the board sensors 75 can be configured to detect a convex (FIG. 8) or concave (FIG. 7) curvature of the uneven boards of the topmost tier 24, if any, as shown in FIGS. 7 and 8, respectively. In an embodiment, the curvature of the boards of lumber 26 of the topmost tier 24 can be detected sequentially, as each board 26 crosses the field of view of the board sensors 75. The board sensors 75 may also detect a board of the tier having other irregular shapes, for example a waveform shape (not shown).

In one embodiment, the board sensors 75 and the conveyor actuators are operatively connected to the conveyor controller. The board sensors 75 are configured to send monitored wood data to the conveyor controller which, in turn, actuates the conveyor actuators in accordance with the monitored wood data to adjust a height of corresponding conveyor chains 64 according to the board unevenness and allow a smooth drop of the topmost tier 24. This adjustment of the conveyor chain 64 height is carried out before releasing the topmost tier 24 from the release location 52 and, in an embodiment, before actuating the retaining arms 96, 196, i.e. configuring the retaining arms 96, 196 from the top end configuration to the bottom end configuration. In an embodiment, the adjustment of the conveyor chain 64 height can be carried out simultaneously with the release of the topmost tier 24 from the release location 52, especially if the curvature of the boards of lumber 26 of the topmost tier 24 is detected sequentially.

In an embodiment, the relative heights of the conveyor chains 64 can be adjusted, individually or collectively, based on the monitored wood data of the front lumber 26a of the topmost tier 24.

In another embodiment, the relative height of the conveyor chains 64 can be adjusted dynamically as the boards cross the release location 52 sequentially. Therefore, if some boards 26 of the topmost tier 24 have different kinds of deformation (unevenness), the level (i.e. relative height) of the conveyor chains 64 of the conveyor 62 can be adjusted in real time for each of the tiers that slides downwardly past the release location 52 to ensure that the tier 24 remains as an assembled unit. In such embodiment, the assembly of board sensors 75 and conveyor actuators is more precise and quicker: the board sensors 75 measure the board deformation at a higher frequency, forward the monitored wood data quicker to the conveyor controller, the conveyor controller calculates the required adjustments for the conveyor actuators, and forwards this information to the conveyor actuators at a higher frequency.

In an embodiment of the tilt hoist system 40 including rails 92 for transitioning the topmost tier 24 to the outfeed 60, a height adjustment mechanism can be operatively connected to the rails 92 and, therefore, a relative position/height of the rails 92 can be adjusted in accordance with the data monitored by the board sensor(s) 75. In one embodiment, a bottom end of each rail 92 is pivotally connected to the support base 58 adjacent the input end of the outfeed 60 such that, upon actuation of the height adjustment mechanism, a top end of each rail 92 is free to move upward and downward to adjust the inclination of the rails 92 and the upper threshold T.

In the embodiment shown in FIGS. 2, 3A, 3B, and 3C, each one of the rails 92 is associated with a rail actuator 95, mounted below it. In the non-limitative embodiment shown, each one of the rail actuators 95 includes a plurality of pneumatic cylinders 95a, 95b, 95c mounted serially, each one of the pneumatic cylinders 95a, 95b, 95c being characterized by a different stroke. An upper one of the pneumatic cylinders 95a, 95b, 95c abut a lower surface of the corresponding one of the rails 92 (or the transition track 90). Therefore, the pneumatic cylinders 95a, 95b, 95c can be activated independently to adjust the height of the corresponding one of the rails 92 in accordance with the data monitored by the board sensor(s) 75. Therefore, in a non-limitative embodiment, the pneumatic cylinders 95a, 95b, 95c can have a 0.5 inch, 1 inch and 1.5 inch stroke respectively. Therefore, to raise a respective one of the rails 92 by 0.5 inch, only the first pneumatic cylinder 95a is activated. To raise a respective one of the rails 92 by 2 inches, the first and the third pneumatic cylinder 95a, 95c are activated. It is appreciated that the rail actuator 95 can vary from the embodiment shown. It is appreciated that the rail actuator 95 can include only one pneumatic cylinder which course can be adjustable.

Topmost tiers 24, when transitioning from the stack 20 to the outfeed 60, can skew, i.e. they can end up in a configuration wherein the boards 26 do not extend as an assembled unit, are at least partially superposed, are twisted and/or the board configuration is distorted. The board sensors 75 of the tilt hoist system 40 can be configured to detect tier distortion, i.e. the relative position of the boards of the topmost tier 24. Therefore, it is possible to configure the board sensors 75 and/or the conveyor controller to detect if a topmost tier 24 becomes skewed during transfer from the stack 20 to the outfeed 60. As mentioned above, the board sensors 75 can be operatively connected to the conveyor controller, which in turn can be operatively connected to other actuators of the tilt hoist system 40, including actuators of the conveyor 62. Therefore, if distortion in the transfer of the topmost tier 24 is detected by the board sensors 75 following an analysis of the captured wood data (e.g., captured images, captured distances) by the conveyor controller, the conveyor controller can stop the actuators of the conveyor 62 (and other actuators) to avoid potential safety issues (e.g. boards 26 getting thrown out or ejected of the tilt hoist system 40) and to avoid downtime if the distorted tier gets skewed on the conveyor chains 64. In another implementation, if distortion in the transfer of the topmost tier 24 is detected by the board sensors 75 following an analysis of the captured wood data by the conveyor controller, the conveyor controller can stop the transfer of the topmost tier 24 to the conveyor 62. For instance, displacement of the retaining arms 96, 196 can be halted to prevent further transfer of the topmost tier 24 towards the conveyor 62. In still another implementation, the relative height of the boards 26 of the topmost tier 24 can be adjusted, for instance and without being limitative by adjusting the height of the conveyor chains 64. In some implementations, the board sensors 75 in combination with the conveyor controller can be configured to further detect if a respective one of the topmost tier 24 has entirely passed the release location 52 and that the tilt hoist system 40 is ready to prepare and release a subsequent topmost tier by engaging the retaining arms 96, 196 with the front lumber 26a of the subsequent topmost tier. In some implementations, different sensors can be used to detect tier distortion, board shape and/or position of a board or the topmost tier with respect to the release location 52.

Thus, during operation of the tilt hoist system 40, the topmost tiers 24 of the lumber stack 20 are sequentially released from the release location 52 towards the outfeed 60 and, more particularly, the conveyor 62. Before being released, the boards 26 of the topmost tier 24 extend substantially parallel to one another and perpendicular to a conveying direction of the tilt hoist system 40. During transfer of the released topmost tier 24 from the release location 52 to the outfeed 60, the configuration of the boards 26 in the tier 24 is monitored. If a skewed configuration is detected, the conveyor 62 and/or the retaining arms 96, 196 are/is stopped to prevent further advance of the boards 26 in an inappropriate configuration along the conveying line.

Figure 11:
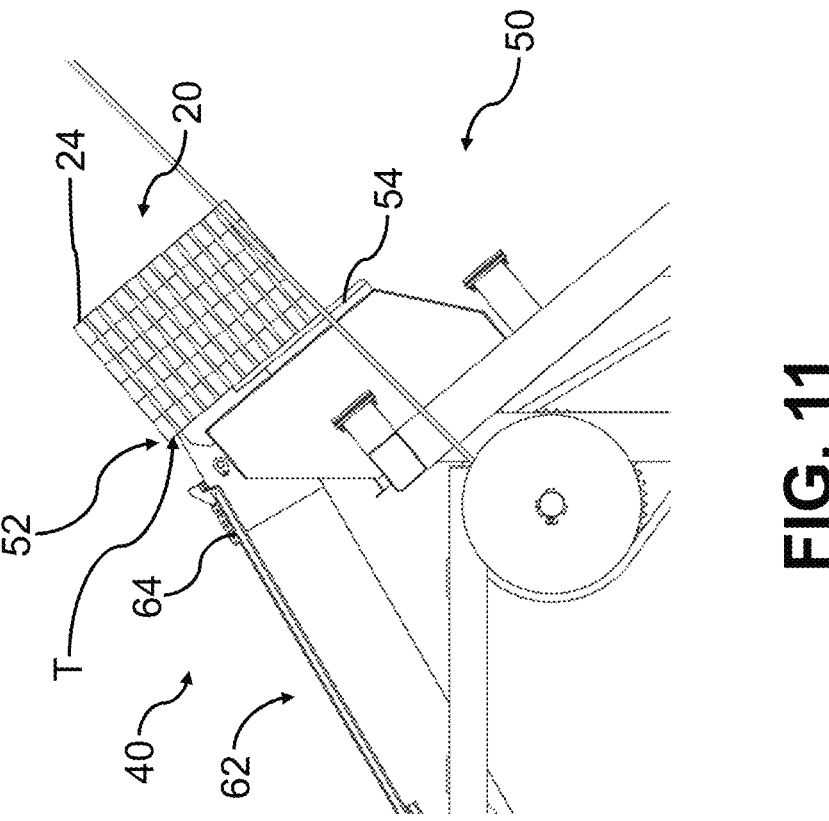
FIG. 11 is another enlarged side elevation view of the tilt hoist system of FIG. 10, wherein an outfeed of the tilt hoist system is lowered to release a subsequent topmost layer.
Figure 10:
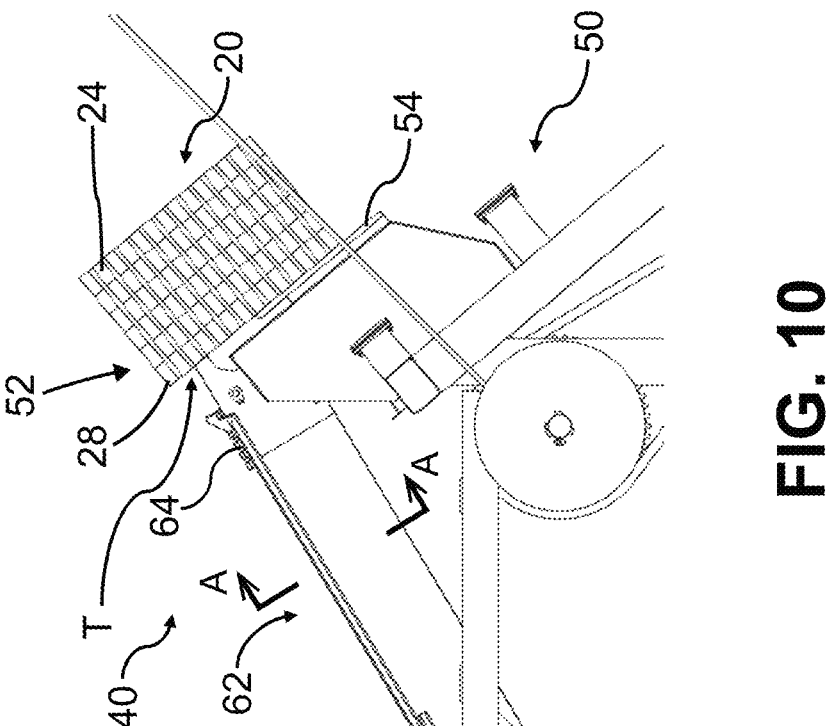
FIG. 10 is an enlarged side elevation view of the tilt hoist system of FIG. 7, wherein at least one topmost layer is raised above an upper threshold of the tilt hoist apparatus.

Referring to FIGS. 10 and 11, there is shown another embodiment of the tilt hoist system 40. In such embodiment, the lift 54 is configured to raise the stack 20 to bring more than one (for instance two) topmost tier 24 to the release location 52 (FIG. 10). As for some of the above-described embodiments, the one of the transition assembly 80 and the conveyor 62, located immediately downstream the release location 52, can include a height adjustment assembly. Thus, even if two or more of the most topmost tiers of the lumber stack 20 are raised above the upper threshold T, only one topmost tier 24 can be released at a time by adjusting the height of either the transition assembly 80 or the conveyor 62, located immediately downstream of the release location 52. In other words, to release solely the upper one of the topmost tiers raised above the upper threshold T, an upper surface of the transition assembly 80 or the conveyor 62 can be aligned with or located slightly below a bottom surface of the upper one of the topmost tiers but above the bottom surface of a second one of the topmost tiers. Therefore, according to one embodiment having the transition assembly 80 with the retaining arms 96, 196, once the retaining arms 96, 196 pivot from the top end configuration towards the bottom end configuration (or once any other suitable release mechanism is engaged), only the upper one of the topmost tiers is transferred towards and to the outfeed 60. Then, to release the second one of the topmost tiers, the one of the transition assembly 80 and the conveyor 62 (FIG. 11) is lowered until it is aligned with or located slightly below a bottom surface of the second one of the topmost tiers. The same sequence is repeated until all the topmost tiers that have been raised above the upper threshold T by the lift 54 have been transferred to the outfeed 60. Then, the lift 54 raises another set of topmost tiers from the stack 20 above the upper threshold T.

Once again, simultaneously lifting a plurality of topmost tiers from the stack 20 above the upper threshold T and gradually lowering the one of the transition assembly 80 and the conveyor 62, located immediately downstream the release location 52, to sequentially release the topmost tiers can accelerate the transition cycles, i.e. it may results in a gain in cycle time. In some implementations, raising the stack 20 several times for shorter heights takes longer than raising the stack 20 fewer times for longer height raises.

Thus, when operating the tilt hoist system 40 for breaking down a lumber stack 20, the lumber stack 20 is raised by the lift 54 to have at least two topmost tiers extending above the upper threshold T of the tilt hoist system 40 at the release location 52 (FIG. 10). Then, an uppermost one of the at least two topmost tiers is released onto a section of the tilt hoist system 40 located downstream of the release location 52, towards the outfeed 60 of the tilt hoist system 40. Thereby, a subsequent topmost tier of the stack 20 is simultaneously exposed. The section of the tilt hoist system 40 located downstream of the release location 52 can be either the transition assembly 80, if any, and the conveyor 62 (FIG. 11). Then, until all of the at least two topmost tiers extending above the upper threshold T of the tilt hoist system 40 have been released onto the section of the tilt hoist system 40 located downstream of the release location 52, said section is gradually lowered and the subsequent topmost tier of the stack 20 transfers onto said section, thereby another subsequent topmost tier of the stack 20 is simultaneously exposed.

Referring now to FIGS. 12A, 12B, 12C, 12D, 12E, 12F, and 12G, there is shown an embodiment of the tilt hoist apparatus 50 configured to lift the lumber stack continuously. As for some of the above-described embodiments, the tilt hoist apparatus 50 includes a plurality of spaced-apart rails 92 for transitioning the topmost tier 24 to the outfeed 60, a height adjustment mechanism can be operatively connected to the rails 92 and, therefore, a relative position/height of the rails 92 can be adjusted in accordance with the data monitored by the board sensor(s) 75.

The tilt hoist apparatus 50 is similar to the one shown in FIGS. 2, 3A, 3B, 3C, except regarding the rail actuator 95. In the non-limitative embodiment shown, the rail actuator 95 includes one pneumatic cylinder 95a (i.e. first transition track actuator) to adjust the relative height of the respective one of the rails 92 with respect to the other rails 92 in accordance with the board deformation detected by the board sensor(s) 75 and one pneumatic cylinder 95d (i.e. second transition track actuator) to adjust the height of the respective one of the rails 92 with respect to the platform lift 73 and, more particularly, the lumber stack 20 supported and raised by the platform lift 73. As it will be described in more detail below, all the pneumatic cylinders 95d of the spaced-apart rails 92 are activated simultaneously by the same course in the same direction. Therefore, all the pneumatic cylinders 95d of the spaced-apart rails 92 are raised and lowered simultaneously.

It is appreciated that the number of pneumatic cylinder(s) to adjust the relative height of the respective one of the rails 92 with respect to the other rails 92 can vary from the embodiment shown. For instance, it can include more than one pneumatic cylinder mounted serially. Furthermore, it is appreciated that the rail actuator, including the relative height actuator 95a and the height actuator 95d, can vary from the embodiment shown.

In the previous embodiments, the platform lift 73 was configured to raise the lumber stack 20 by discrete increments, i.e. to raise one or two rows above the threshold T (or to the release location 52), and then, remain at a same height while the rows are transferred to the outfeed 60. However, the wood load supported by the platform lift 73 is relatively heavy and sequentially raising the platform lift 73 by discreet increments can be difficult for the actuators due to the non-negligeable inertia of the platform lift 73 and the lumber stack 20 supported thereon.

In the present embodiment, the platform lift 73 is raised continuously and the transition assembly 80, including the rail actuators 95 and the movable retaining arms 196, and the outfeed 60, including the outfeed conveyor 62, are synchronized therewith. In the non-limitative embodiment shown, the tilt hoist apparatus 50 includes the retaining arms 196. However, it is appreciated that the retaining arms 96 or any alternative thereof can be used with the tilt hoist apparatus 50.

More particularly, the rail actuators 95d are controlled to follow the platform lift 73 during its upward displacement until the topmost tier 24 is released. More particularly, the rail actuators 95d are extended in a manner such that the upper surfaces of the rails 92 are substantially aligned with the lower surface of the topmost tier 24 (i.e. either the lower surface of the boards of the topmost tier 24 or the lower surface of the spacers 32 supporting the topmost tier 24), while the bundle 20 is raised. Once the release location 52 is reached, the topmost tier 24 is released, controlled and guided along the rails 92 by the movable retaining arms 196. During transfer of the topmost tier 24 to the outfeed 60, the rails 92 are continuously raised by the rail actuators 95d. Once the topmost tier 24 is released and entirely supported by the outfeed 60, the rail actuators 95d retract to adjust their height to be aligned approximately with a lower surface of the subsequent topmost tier 24. Hereinafter, the lower surface of the topmost tier 24 is intended to be either the lower surface of the boards of the topmost tier 24 or the lower surface of the spacers 32 supporting the topmost tier 24.

The transition assembly 80 including the release arms 196 and the rail actuators 95a, 95d, the lift platform 73, the board sensors 75, and the outfeed 60 can be operatively connected to a controller unit to synchronize their various configurations/positions.

Figure 12A:
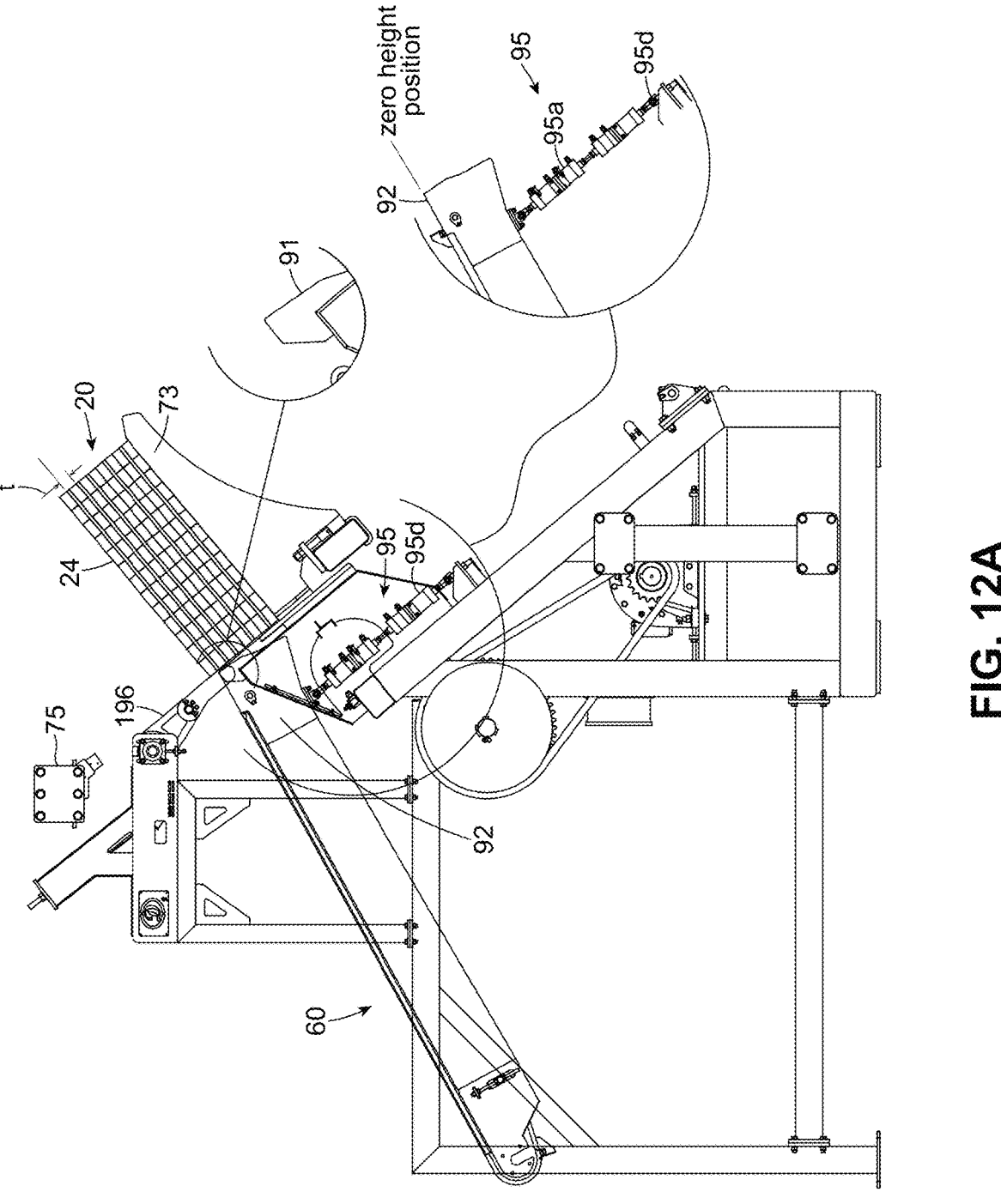
FIGS. 12A, 12B, 12C, 12D, 12E, 12F, and 12G are each a side elevation view of the tilt hoist system shown in FIG. 2, wherein a top most tier is sequentially released and transferred to the outfeed of the tilt hoist system, a lift platform carrying a bundle is raised continuously, and rails of the transition assembly are raised and lowered to follow a topmost tier of the bundle.

Referring now to FIG. 12A, the tilt hoist apparatus 50 and, more particularly, the rails 92 are configured in the release height position, wherein the topmost tier 24 is configured to be transferred to the outfeed 60, abutted against and maintain by the retaining arms 196. The retaining arms 196 are configured in the top end configuration. The rail actuators 95d are in a substantially contracted configuration, after having released and transferred the previous topmost tier to the outfeed 60, i.e. the rails 92 are in a zero height position.

In this non-limitative example, each tier is 2¾ inches thick and in FIG. 12A, the rails 92 are in the zero height position and the rail actuators 95d are contracted.

Figure 12B:
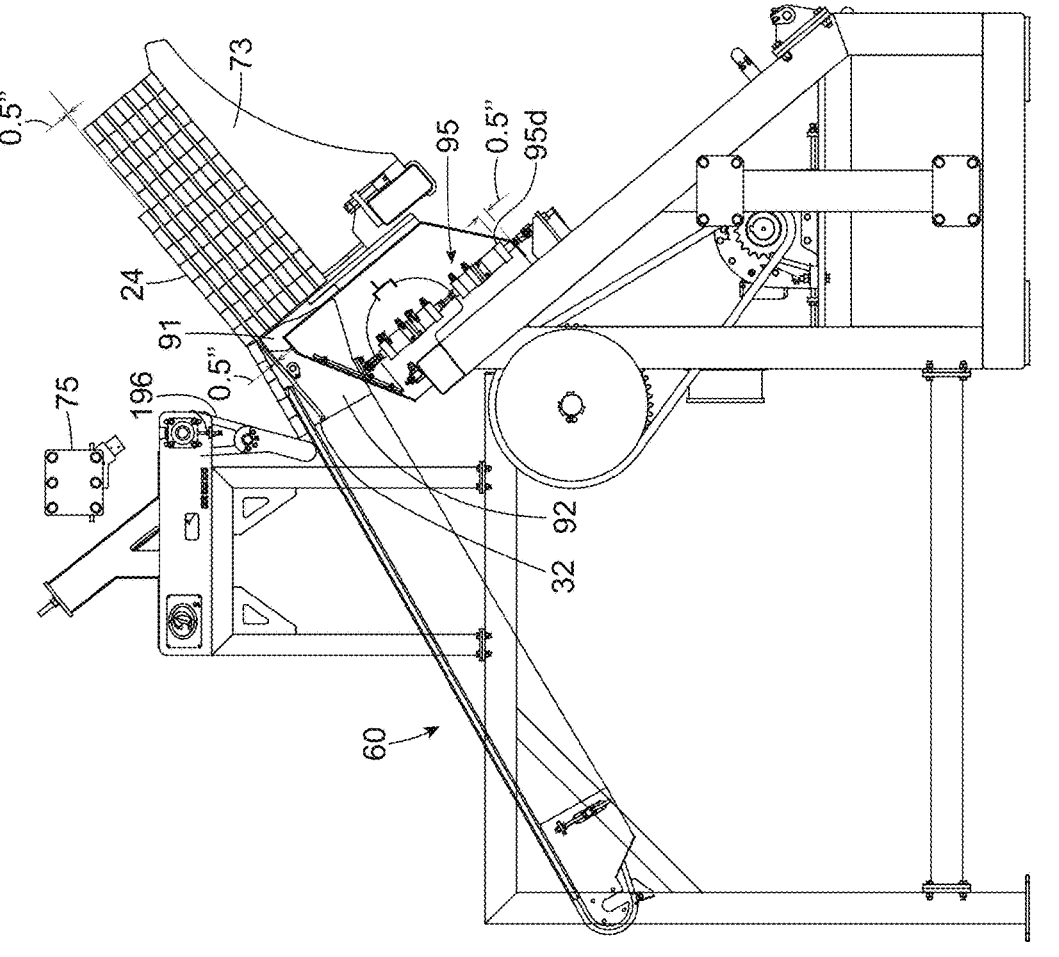

Turning now to FIG. 12B, the topmost tier 24 is released and transferred towards the outfeed 60, controlled and guided along the rails 92 by the movable retaining arms 196. The retaining arms 196 are configured in one of the intermediate configurations. The rail actuators 95d are gradually extended while the lift platform 73 is raised continuously. The upper surfaces of the rails 92 remain substantially aligned with the lower surface of the topmost tier 24 being transferred to the outfeed 60.

In this non-limitative example, at FIG. 12B, the lift platform 73 is raised by 0.5 inch in comparison with FIG. 12A. Therefore, the rail actuators 95d and the rails 92 are also extended and raised by 0.5 inch.

Figure 12C:
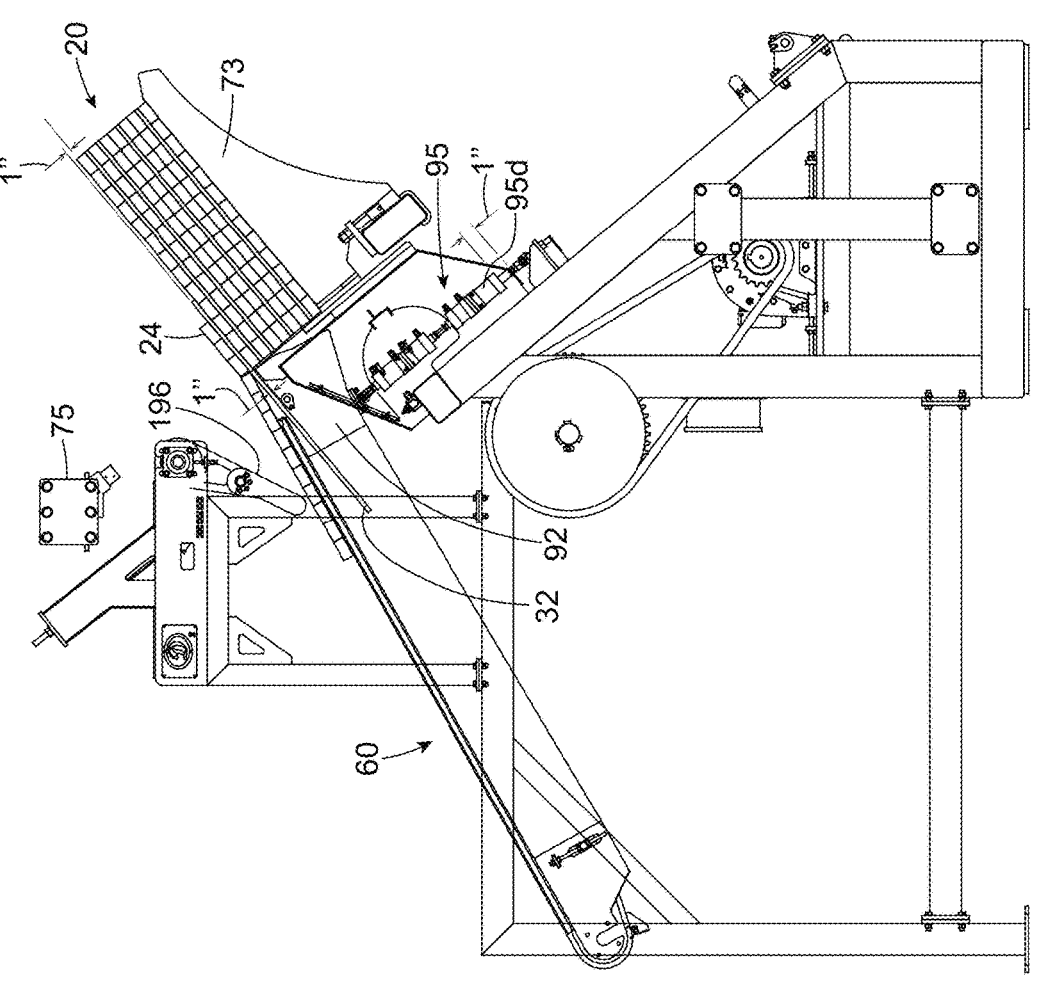
Figure 12D:
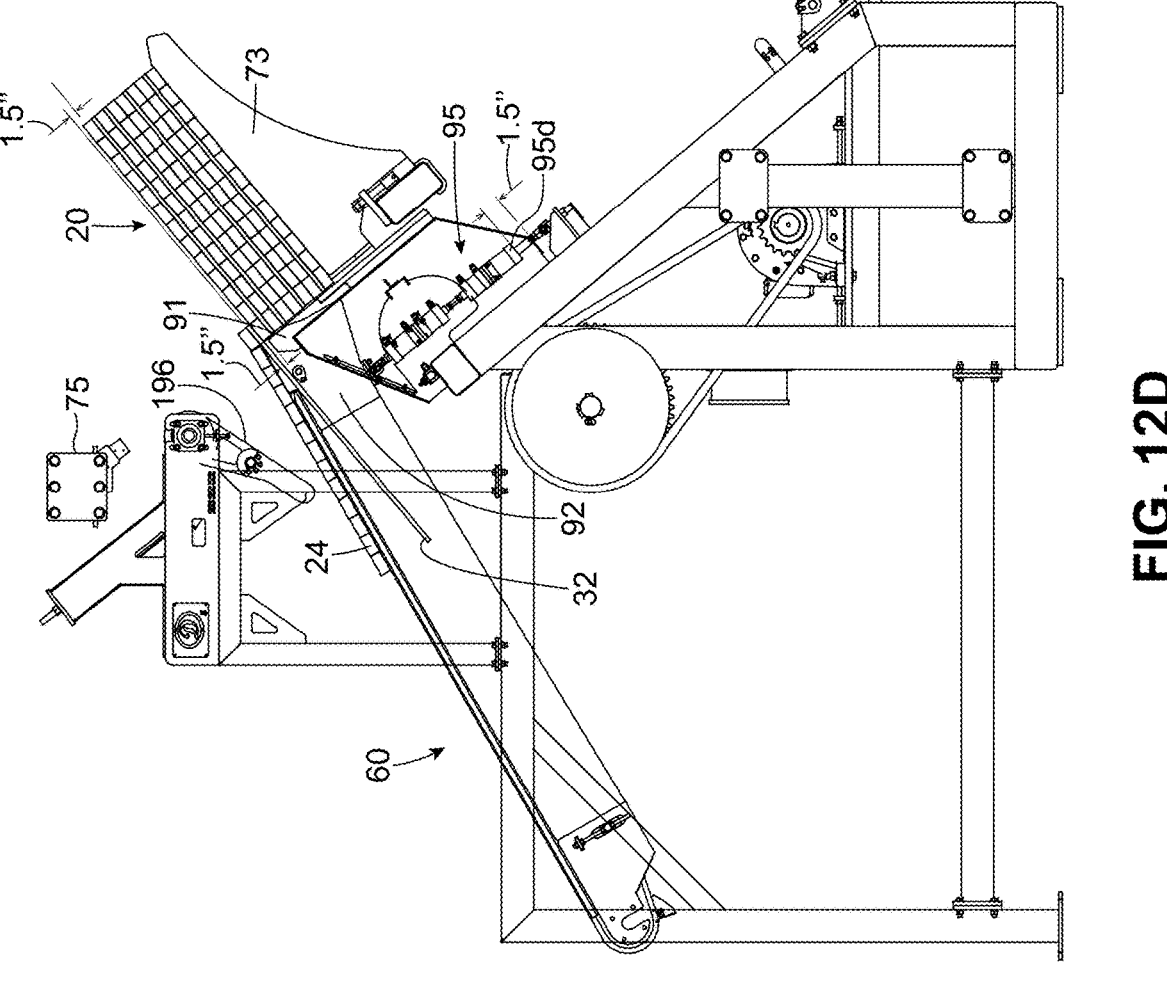
Figure 12E:
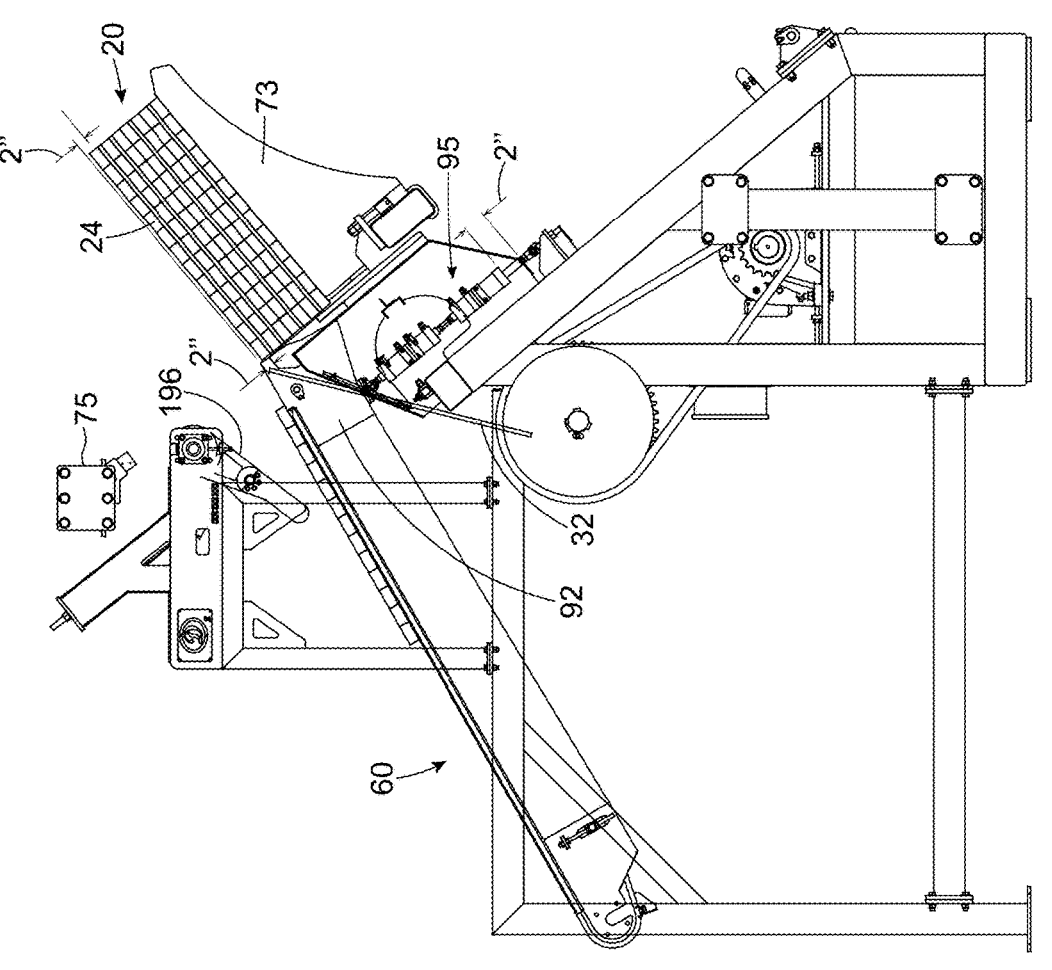

In FIGS. 12C, 12D, 12E, the topmost tier 24 is still being released and transferred towards the outfeed 60, with the movable retaining arms 196 having transferred control of the topmost tier 24 to the outfeed 60. The retaining arms 196 are configured in the bottom end configuration. The rail actuators 95d are further extended in comparison to the configuration of FIG. 12B, with the rail actuators 95d being further extended in 12C than 12D and in FIG. 12E than 12D.

In this non-limitative example, each of the lift platform 73, the rail actuators 95d, and the rails 92 in comparison with FIG. 12A is extended/raised by 1 inch (FIG. 12C), 1.5 inch (FIG. 12D), and 2 inches (FIG. 12E) respectively.

Figure 12F:
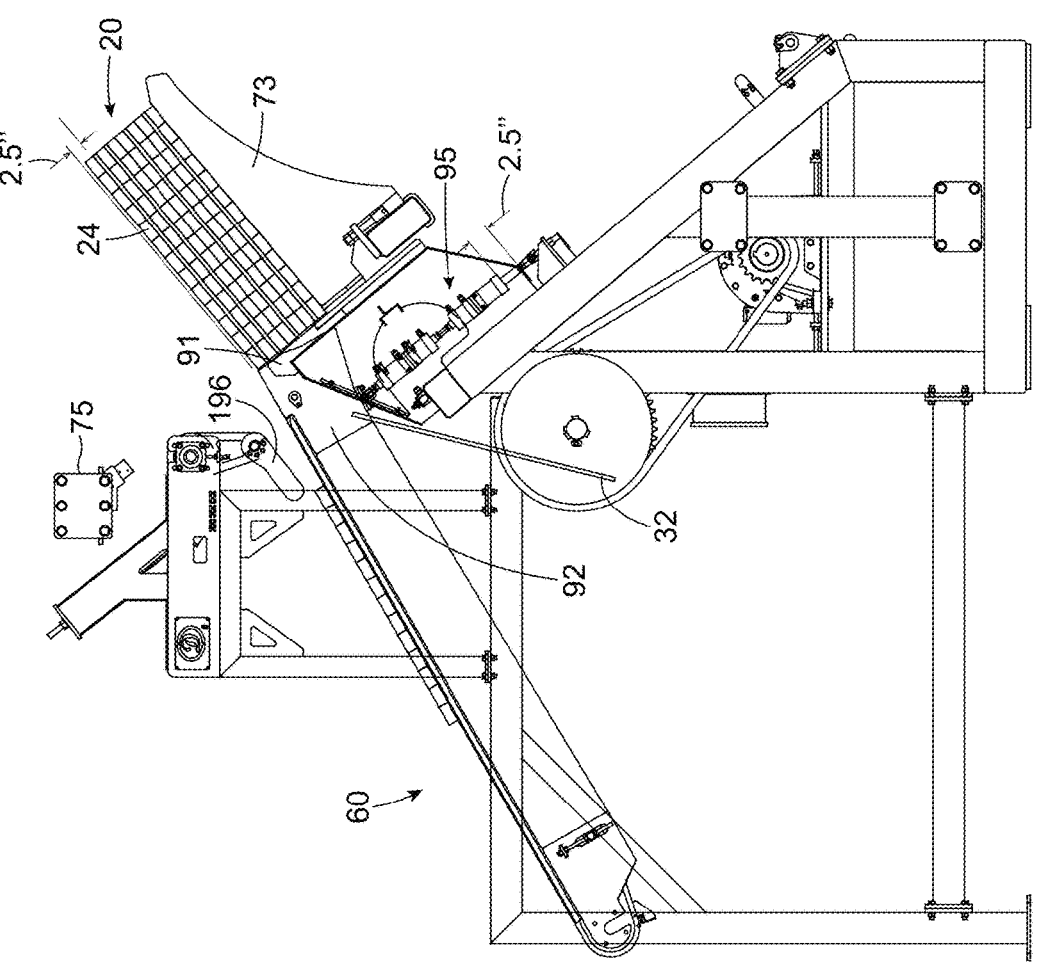

In FIG. 12F, the topmost tier 24 is fully transferred to the outfeed 60 and the rail actuators 95d are at their maximum extension. The movable retaining arms 196 are pivoted towards the release location 52 to be configured in the top end configuration.

In this non-limitative example, each of the lift platform 73, the rail actuators 95d, and the rails 92 in comparison with FIG. 12A is extended/raised by 2.5 inches.

Figure 12G:
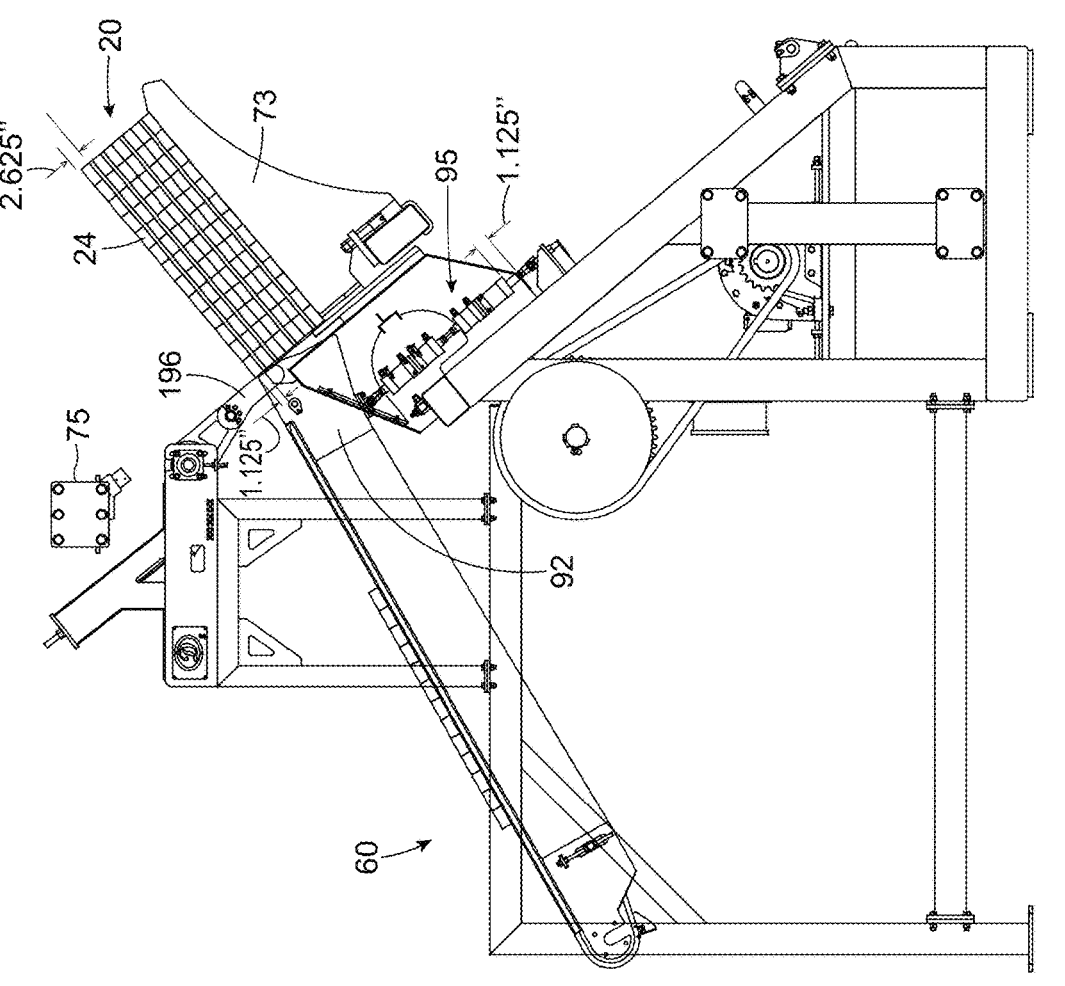

In FIG. 12G, the rail actuators 95d are retracted into their compacted configuration to reach the configuration of FIG. 12A and be substantially aligned with the lower surface of the topmost tier 24, while the bundle 20 is raised to the release location 52, i.e. the zero height position. The movable retaining arms 196 are configured in the top end configuration, retaining the subsequent topmost tier 24.

In this non-limitative example, the lift platform 73 is raised by 2.625 inches in comparison with FIG. 12A and the rail actuators 95d are quickly contracted. The rails 92 are lowered simultaneously with the contraction of the rail actuators 95d until the position of FIG. 12A is reached.

As shown in FIGS. 12B, 12C, 12D, 12E, and 12F, spacer sticks 32 are released simultaneously with the topmost tier 24 and fall between two adjacent ones of the rails 92.

It is appreciated that the rail actuators 95a can be extended and contracted simultaneously with the rail actuators 95d to compensate for distortion along a length of the boards of the topmost tier 24.

In the embodiment shown, the transition assembly 80 further includes spaced-apart abutments 91, located adjacent to the top end 93 of the transition track 90 and, more particularly, the rails 92 against which the topmost tier 24 and the spacers 32 supporting the boards of the topmost tier 24 abut until reaching the release location 52. The height of the abutments 91 does not change while raising the lift platform 73 and raising/lowering the transition track 90 and, more particularly, the rails 92.

It is also appreciated that, in an alternative embodiment (not shown), the transition track can differ from the spaced-apart rails 92 shown and that the rail actuators 95, 95a, 95b, 95c, 95d can be replaced by other types of suitable transition track actuator(s), such as and without being limitative a hydraulic, electric and/or any other suitable type of positioning system. In an embodiment, the rail actuators configured to displace vertically the rails simultaneously and relatively to one another can be embodied by a single actuator per rail wherein the course of the rail is adjusted to (a) follow the height of the topmost tier 24 of the bundle 20 and (b) take into account the detected board deformation.

Thus, for operating the tilt hoist system for breaking down a lumber stack 20 having a plurality of tiers 22 of lumber, the lumber stack 20 is raised continuously, for instance by the lift platform 73. The transition track 90, such as the plurality of spaced-apart rails 92, are raised simultaneously to maintain substantial alignment between an upper surface of the transition track 90 and a lower surface of the topmost tier 24. When the topmost tier 24 of the lumber stack 20 reaches the release location 52, the topmost tier 24 is released onto the transition track 90, located downstream of the release location 52, towards the outfeed 60 of the tilt hoist system and simultaneously exposing a subsequent topmost tier of the stack 20 while still raising continuously the lumber stack 20 and the transition track 90. When an entirety of the released topmost tier is located on the outfeed 60 of the tilt hoist system, while still raising continuously the lumber stack 20, the transition track 90 is lowered until the upper surface of the transition track 90 is substantially aligned with a lower surface of the subsequent topmost tier 24.

Thus, the transition track 90, such as the rails 92, are displaceable vertically by a transition track actuator, such as the rail actuators 95.

In an embodiment, a board deformation of the topmost tier 24 is simultaneously detected and the relative height of the spaced-apart rails 92 is adjusted using the detected board deformation of the topmost tier 24.

Turning now to FIG. 13A, the tilt hoist apparatus 50 further includes a lift safety mechanism 65 to prevent the lift 54 and/or the stack 20 from falling uncontrollably in case of a mechanical failure or any other reason. The safety mechanism 65 is operatively connected to a stack-supporting platform 73 (hereinafter, the "platform" 73) of the lift 54 supporting the stack 20 as it is being raised towards the release location 52. It should be noted that, in the non-limitative embodiment of FIG. 13A, the lift 54 is shown in an upright orientation (i.e., with the platform 73 being generally parallel to the ground), and not in an inclined orientation (i.e., with the platform being generally perpendicular to the face of the support base 58) as previously shown. The safety mechanism 65 is configured to automatically and lockingly engage the platform 73 of the lift 54 being raised along the face of the support base 58, thereby minimizing a drop distance in case of a failure. When the platform 73 of the lift 54 is planned to move downwardly in normal operation, for instance to mount another stack 20 thereon, the safety mechanism 65 can be disengaged. In some implementations, the safety mechanism 65 can be disengaged along an entire displacement length or sequentially, along sections thereof. The safety mechanism 65 remains engageable, even in case of power supply shortage.

In the non-limitative embodiment shown, the lift safety mechanism 65 includes a toothed rack 67 (i.e., a linear ratchet) secured to the support base 58 and a biased pawl 69 pivotally mounted to the lift 54 and, more particularly, to the platform 73, and engageable with the toothed rack 67 in a locking configuration (FIGS. 13A and 13B). As explained in more details below, the pawl 69 can be biased by incorporating a counterweight or any other biasing means, such as a spring-load. The lift safety mechanism 65 also includes a lever assembly 71 to configure the biased pawl 69 in an unlocking configuration (not shown) to disengage the pawl 69 from the toothed rack 67 and thus enable the intentional lowering of the lift 54, as explained in more details below. More particularly, in the embodiment shown, the biased pawl 69 has a finger portion 69a with a downward hook and a counterweight portion 69b extending from a proximal end of the finger portion 69a. As such, the biased pawl 69 shown is a weighted biased pawl. In the embodiment, the finger portion 69a of the pawl 69 is pivotally connected to the platform 73 about the proximal end thereof, such that the counterweight portion 69b and the hook of the finger portion 69a (i.e. located at a distal end of the finger portion 69a) are opposite with respect to the pivot point. The counterweight portion 69b shown is implemented by a weighted plate, but other shapes and sizes for the counterweight portion 69b (and the finger portion 69a) are contemplated herein. The hook of the finger portion 69a is correspondingly sized and shaped with respect to the teeth of the toothed rack 67 to lockingly engage therewith.

Thus, it is understood that the toothed rack 67 and the biased pawl 69 of the lift safety mechanism 71 generally cooperate with one another in accordance with a general linear ratchet assembly to safely raise the platform 73. For instance, when operating the tilt hoist apparatus 50, as the platform 73 is gradually raised when the lift 54 translates upwardly on the face of the support base 58, the biased pawl 69 raises simultaneously. As a result, the finger portion 69a of the biased pawl 69 engages consecutive teeth of the toothed rack 67. Each time the finger portion 69a of the biased pawl 69 pivots and straddles over a tooth of the toothed rack 67, the biased pawl 69 returns into a configuration illustrated in FIGS. 13A and 13B for instance, hereinafter referred to as a "locking configuration". In the locking configuration, a portion of the platform 73, such as a horizontal beam, rests on (i.e. is being held by) a top surface of the finger portion 69a of the biased pawl 69, which lockingly engages a groove of a tooth of the toothed rack 67. To allow the platform 73 to lower, the lever assembly 71 enables the transition of the biased pawl 69 from the locking configuration to an unlocking configuration (not shown) with the toothed rack 67. The counterweight portion 69b biases the biased pawl 69 to rotate clockwise (from the perspective of FIG. 13A) when platform 73 is lowered, thereby disengaging the finger portion 69a from the toothed rack 67. Alternatively, other implementations of the toothed rack 67 and the biased pawl 69 pivotally mounted to the lift 54 are envisioned herein.

In case of an unexpected lowering of the lift 54 and the platform 73, a portion of the platform 73 abuts against the finger portion 69a. Simultaneously, if not already engaged, the hook of the finger portion 69a of the biased pawl 69 engages into a notch of a corresponding tooth of the toothed rack 67. In other words, in case of an unexpected lowering of the lift 54, the biased pawl 69 becomes constricted in the locking configuration (FIGS. 13A and 13B) between relatively heavy and perhaps loaded platform 73 and a corresponding tooth of the toothed rack 67.

Still referring to the embodiment of the lift safety mechanism 65 shown in FIGS. 13A and 13B, the counterweight portion 69b of the biased pawl 69 has a pin 69c protruding transversely from a lower side thereof. Alternatively, the pin 69c can be embodied by a rib or a hook, for instance and without being limitative. The pin 69c is configured to collaborate with the lever assembly 71, as detailed in the following paragraphs.

Referring to FIGS. 13A and 13B, the lever assembly 71 is shown in a raised configuration, with the pin 69c of the biased pawl 69 abutting thereon. When lowering the lift 54, the lever assembly 71 is lowered and configured in an extended configuration (not shown), i.e. further away from the toothed rack 67. The biased pawl 69 is pivoted simultaneously about its pivoting axis extending through the lever assembly 71. More particularly, the biased pawl 69 rotates counterclockwise (from the perspective of FIG. 13A), out of engagement from the toothed rack 67, corresponding to the unlocking configuration (not shown). The pin 69c remains abutted against the lever assembly 71. As a result, the finger portion 69a of the biased pawl 69 does not obstruct with the platform 73 being lowered. It is understood that for the biased pawl 69 to disengage from the toothed rack 67, the height of the platform 73 should be adjusted to allow an offset between the hook of the biased pawl 69 and the groove of the tooth of the toothed rack 67.

The lever assembly 71 shown in FIGS. 13A and 13B includes first and second support arms 71a, 71b each pivotally mounted to the frame of the platform 73 and an unlocking lever 71c pivotally interconnected to both the first and second support arms 71a, 71b at opposite ends thereof such that the unlocking lever 71c remains substantially parallel to the frame of the platform 73. The first (lower) and second (upper) support arms 71a, 71b are sized and shape— and are particularly provided with a length—sufficient for the unlocking lever 71c to contact and eventually push on the pin 69c of the biased pawl 69, thus enabling the extended configuration of the lever assembly 71 to configure the biased pawl 69 in the unlocking configuration, as explained above. In the exemplary embodiment shown, the first and second support arms 71a, 71b have the same length.

As previously mentioned, the lever assembly 71 has the retracted configuration (FIGS. 13A and 13B) corresponding to the locking configuration of the biased pawl 69 and an extended configuration (not shown) corresponding to the unlocking configuration of the biased pawl 69. In the retracted configuration shown, the first and second support arms 71a, 71b of the lever assembly 71 are pivoted upward with respect to their respective connections on the toothed rack 67, thus configured the unlocking lever 71c into a configuration closer to the toothed rack 67 and allowing the biased pawl 69 to be configured in the locking configuration, as previously explained. In the extended configuration of the lever assembly 71 (not shown), the first and second support arms 71a, 71b of the lever assembly 71 are pivoted in a clockwise direction (from the perspective of FIG. 13A) with respect to their respective connections with the toothed rack 67 so as to displace the unlocking lever 71c laterally and away from the toothed rack 67, thus pushing and configuring the biased pawl 69 into the unlocking configuration, as previously explained.

In one embodiment, the lever assembly 71 can be biased to remain in the retracted configuration, i.e. closer to the toother rack 67. In another embodiment, the lift safety mechanism 75 further includes a lever actuator operatively coupled to the lever assembly 71. As shown in FIGS. 13A and 13B, the lever actuator 72 is operatively coupled to the first (lower) support arm 71a of the lever assembly 71 and is configured to pull the first support arm 71a downward to configure the lever assembly 71 into the extended configuration.

It is appreciated that the lift safety mechanism 65 can differ from the embodiment shown.

In the previous description, non-limitative implementations of the method are described. Although these embodiments of the assembly and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the method, as will be briefly explained herein and as can be easily inferred herefrom by a person skilled in the art. Moreover, it will be appreciated that positional descriptions such as "above", "below", "left", "right", "bottom", "top", "end" and the like should, unless otherwise indicated, be taken in the context of the figures and should not be considered limiting.

Furthermore, in the previous description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The implementations, geometrical configurations, materials mentioned and/or dimensions shown in the figures are optional and are given for exemplification purposes only.

In the present description, an embodiment is an example or implementation. The various appearances of "one embodiment", "one implementation", "an implementation" or "some implementations" do not necessarily all refer to the same implementation or embodiment. Although various features may be described in the context of a single implementation, the features may also be provided separately or in any suitable combination. Conversely, although the invention may be described herein in the context of separate implementations for clarity, it may also be implemented in a single embodiment. Reference in the specification to "some implementations", "an implementation", "one implementation" or "other implementations" means that a particular feature, structure, or characteristic described in connection with the implementations or embodiment is included in at least some implementations, but not necessarily all implementations.

It is to be understood that the phraseology and terminology employed herein are not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not to be construed that there is only one of that element. It is to be understood that where the specification states that a component, feature, structure, or characteristic "may", "might", "can" or "could" be included, that particular component, feature, structure, or characteristic is not required to be included.

It will be appreciated that the methods described herein may be performed in the described order, or in any suitable order.

Several alternative embodiments, implementations and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

What is claimed is:

1. A tilt hoist system for breaking down a lumber stack having a plurality of tiers of lumber, the tilt hoist system comprising:

a tilt hoist apparatus configured to tilt the lumber stack into an inclined orientation and to lift said lumber stack to successively bring a topmost tier thereof at a release location;

an outfeed comprising a conveyor configured to receive each tier of lumber from the tilt hoist apparatus and convey the same away from the tilt hoist apparatus; and a transition assembly for guiding each tier of lumber from the tilt hoist apparatus to the outfeed, the transition assembly comprising:

a transition track extending at a downward inclination and having a top end positioned to receive each tier of lumber from the tilt hoist apparatus, and a bottom end adjacent to the outfeed;

one or more movable retaining arms; and a transition assembly controller connected to the retaining arms and configured to move the same according to a transition sequence comprising:

positioning the retaining arms at a top end position wherein said retaining arms contact a longitudinal side edge of a front piece of lumber of the topmost tier of the lumber stack to receive and hold said topmost tier at the release location;

moving the one or more retaining arm away from the tilt hoist apparatus, thereby releasing the topmost tier of lumber onto the transition track, and along a trajectory following the transition track while maintaining said contact with said front piece of lumber; and moving the one or more retaining arm out of contact with the front piece of lumber upon reaching the bottom end of the transition track, thereby releasing the tier of lumber onto the conveyor of the outfeed.

2. A tilt hoist system for breaking down a lumber stack having a plurality of tiers of lumber, the tilt hoist system comprising:

a tilt hoist apparatus configured to tilt the lumber stack into an inclined orientation and to lift said lumber stack to successively bring a topmost tier thereof at a release location;

an outfeed comprising a conveyor configured to receive each tier of lumber from the tilt hoist apparatus and convey the same away from the tilt hoist apparatus; and a transition assembly for guiding each tier of lumber from the tilt hoist apparatus to the outfeed, the transition assembly comprising:

a transition track extending at a downward inclination and having a top end positioned to receive each tier of lumber from the tilt hoist apparatus, and a bottom end adjacent to the outfeed;

one or more movable retaining arms configurable in a top end configuration wherein the retaining arms are positioned adjacent to the top end of the transition track and contact a longitudinal side edge of a front piece of lumber of the topmost tier of the lumber stack to receive and hold said topmost tier at the release location and a bottom end configuration wherein the retaining arms are positioned past the bottom end of the transition track, out of contact with the front piece of lumber upon reaching the bottom end of the track, thereby releasing the tier of lumber onto the conveyor of the outfeed; and a retaining arm actuator operatively connected to the retaining arms to move the retaining arms between the top and bottom end configurations.

3. The tilt hoist system of claim 2, wherein the transition assembly further comprises a rotatable shaft, wherein the one or more retaining arms are distributed along a longitudinal length of the rotatable shaft, and wherein the retaining arm actuator is operatively connected to the shaft and is configured to rotate the shaft between angular orientations corresponding respectively at least to the top and bottom end configurations.

4. The tilt hoist system of claim 3, wherein each of the one or more retaining arms comprises at least two sections including a proximal section secured to the shaft to rotate therewith and a distal section adapted to contact the topmost tier, the distal section being pivotally mounted to the proximal section at a pivot axis, and wherein the transition assembly further comprises a second retaining arm actuator operatively connected to at least the distal section to pivot the distal section with respect to the proximal section about the pivot axis.

5. The tilt hoist system of claim 3, wherein the one or more retaining arms comprise at least two sets of retaining arms and the shaft comprises at least two shafts, each one of the two or more sets of retaining arms being operatively connected to a respective one of the at least two shafts, the at least two sets of retaining arms being independently configurable into the top and bottom end configurations.

6. The tilt hoist system of claim 2, wherein the tilt hoist apparatus is configured to lift the lumber stack continuously.

7. The tilt hoist system of claim 2, wherein the transition track comprises a plurality of spaced-apart rails extending between the release location of the tilt hoist apparatus and the outfeed and the shaft extends above the transition track and transversely thereto.

8. The tilt hoist system of claim 7, wherein the transition assembly further comprises a height adjustment mechanism, and wherein each one of the plurality of rails is pivotally connected to the height adjustment mechanism, the height adjustment mechanism being activable to modify an inclination of each one of the plurality of rails.

9. The tilt hoist system of claim 2, wherein the conveyor comprises a plurality of spaced-apart conveyor chains, each conveyor chain having an input end located adjacent to the release location of the tilt hoist apparatus, and wherein the plurality of conveyor chains is rotatable to convey the topmost tier away from the tilt hoist apparatus and wherein the tilt hoist system further comprises:

at least one board sensor configured to monitor a board deformation of at least a portion of the topmost tier;

a plurality of conveyor actuators, each one being operatively connected to a respective one of the conveyor chains to adjust a relative height thereof; and a conveyor controller operatively connected to the at least one board sensor and the conveyor actuators to adjust a relative height of the conveyor chains using the board deformation of the topmost tier monitored by the at least one board sensor.

10. The tilt hoist system of claim 2, further comprising a pusher or dagger assembly configured to contact at least a rear lumber of the topmost tier and guide same in direction of the outfeed when the topmost tier is released from the release location.

11. The tilt hoist system of claim 2, wherein the tilt hoist apparatus comprises:

a support base;

a lift having a stack-supporting platform, the lift being translatably mounted to the support base; and a lift safety mechanism preventing unintentionally lowering of the stack-supporting platform along the support base.

12. A tilt hoist system for breaking down a lumber stack having a plurality of tiers of lumber, the tilt hoist system comprising:

a tilt hoist apparatus configured to tilt the lumber stack into an inclined orientation and to lift said lumber stack to successively bring a topmost tier thereof at a release location;

an outfeed comprising a conveyor configured to receive each tier of lumber from the tilt hoist apparatus and convey the same away from the tilt hoist apparatus; and a transition assembly for guiding each tier of lumber from the tilt hoist apparatus to the outfeed, the transition assembly comprising:

a transition track extending at a downward inclination and having a top end positioned to receive each tier of lumber from the tilt hoist apparatus, and a bottom end adjacent to the outfeed; and a transition track actuator to raise the transition track simultaneously with the lumber stack until the release location is reached and lower the transition track once the topmost tier is located on the outfeed.

13. The tilt hoist system of claim 12, further comprising one or more movable retaining arms configurable in a top end configuration wherein the retaining arms are positioned adjacent to the top end of the transition track and contact a longitudinal side edge of a front piece of lumber of the topmost tier of the lumber stack to receive and hold said topmost tier at the release location and a bottom end configuration wherein the retaining arms are positioned past the bottom end of the transition track, out of contact with the front piece of lumber upon reaching the bottom end of the track, thereby releasing the tier of lumber onto the conveyor of the outfeed; and a retaining arm actuator operatively connected to the retaining arms to move the retaining arms between the top and bottom end configurations.

14. The tilt hoist system of claim 12, wherein the tilt hoist apparatus is configured to lift the lumber stack continuously.

15. The tilt hoist system of claim 12, wherein the transition track comprises a plurality of spaced-apart rails extending between the release location of the tilt hoist apparatus and the outfeed and each one of the rails is vertically displaceable by the transition track actuator, wherein the transition track actuator comprises a first transition track actuator to displace each one of the rails independently of the other ones of the rails and a second transition track actuator to displace vertically all of the rails simultaneously, 5 and wherein the tilt hoist system further comprises at least one board sensor configured to monitor a board deformation of at least a portion of the topmost tier, the at least one board sensor being operatively connected to the first transition track actuator to adjust a relative height of the rails using the 10 board deformation of the topmost tier monitored by the at least one board sensor.

* * * * *